US012739659B2

(12) United States Patent
Marzban et al.

(10) Patent No.: US 12,739,659 B2
(45) Date of Patent: Sep. 15, 2026

(54) USER EQUIPMENT GROUPING FOR FEDERATED LEARNING

(71) Applicant: QUALCOMM Incorporated, San Diego, CA (US)

(72) Inventors: Mohamed Fouad Ahmed Marzban, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 910 days.

(21) Appl. No.: 18/056,577

(22) Filed: Nov. 17, 2022

(65) Prior Publication Data

US 2024/0171991 A1 May 23, 2024

(51) Int. Cl.
*H04W 16/22* (2009.01)
*H04L 41/16* (2022.01)

(52) U.S. Cl.
CPC ............. *H04W 16/22* (2013.01); *H04L 41/16* (2013.01)

(58) Field of Classification Search
CPC ...... H04W 16/22; H04L 41/16; H04L 41/082; H04L 41/0823; H04L 41/0853; H04L 41/0893; H04L 41/0895; H04L 41/145
See application file for complete search history.

(56) References Cited

U.S. PATENT DOCUMENTS

2021/0150269 A1* 5/2021 Choudhury ........ G06V 30/1985
2021/0160149 A1* 5/2021 Ma ........................ H04L 1/0041
2022/0116764 A1* 4/2022 Pezeshki ................ G06N 3/063
2023/0385688 A1* 11/2023 Sun ........................ G06N 20/00
2024/0023082 A1* 1/2024 Mu ....................... H04W 72/12
2025/0184234 A1* 6/2025 Tong ....................... H04L 41/12

FOREIGN PATENT DOCUMENTS

CN 116843016 A * 10/2023 ............. G06N 3/092
WO WO-2024101064 A1 * 5/2024 ............... G06N 3/08

OTHER PUBLICATIONS

Z. Qin, G. Y. Li and H. Ye, "Federated Learning and Wireless Communications," in IEEE Wireless Communications, vol. 28, No. 5, pp. 134-140, Oct. 2021. (Year: 2021).*
3rd Generation Partnership Project, Technical Specification Group Services and System Aspects, Study on Traffic 2 Characteristics and Performance Requirements for AI/ML Model Transfer in 5GS (Release 18), 3GPP Standard, Technical Report, 3GPP TR 22.874, 3GPP TR 23.700-91, Oct. 6, 2020, pp. 1-55. (Year: 2020).*

(Continued)

*Primary Examiner* — Yuwen Pan
*Assistant Examiner* — Swati Jain
(74) *Attorney, Agent, or Firm* — Harrity & Harrity LLP

(57) ABSTRACT

Various aspects of the present disclosure generally relate to wireless communication. In some aspects, a user equipment (UE) may transmit, to a network node, an indication of a local training data distribution associated with the UE. The UE may transmit, to the network node, local gradient information for a federated learning model that is based at least in part on the local training data distribution associated with the UE. Numerous other aspects are provided.

30 Claims, 12 Drawing Sheets

(56) References Cited

OTHER PUBLICATIONS

Intel: "KI#19, Sol#56: Update to Add Model and Local Training Data Update Service", S2-2007725, 3rd Generation Partnership Project, Elbonia, Oct. 12, 2020-Oct. 23, 2020, 7 Pages. (Year: 2020).*

OPPO: "FS_AMMT: Annex—General principle of Federated Learning over 5GS", 3GPP TSG-SA WG1 e-Meeting #91, S1-203146, 3rd Generation Partnership Project, Aug. 24, 2020-Sep. 2, 2020, 4 Pages. (Year: 2020).*

* cited by examiner

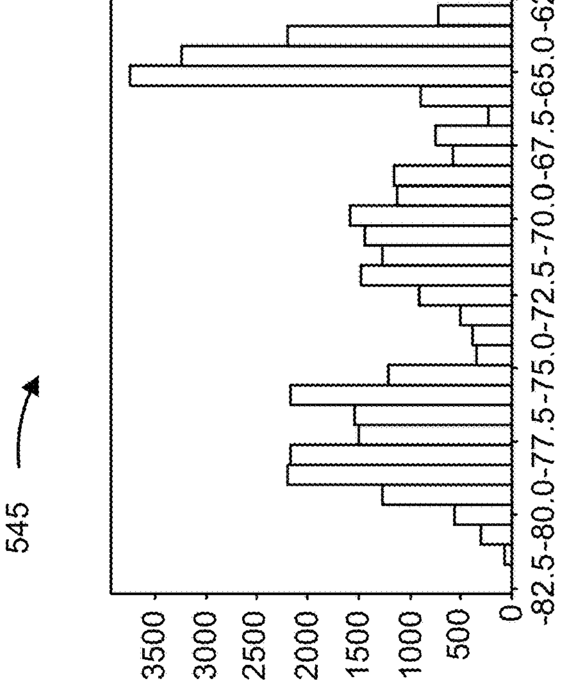
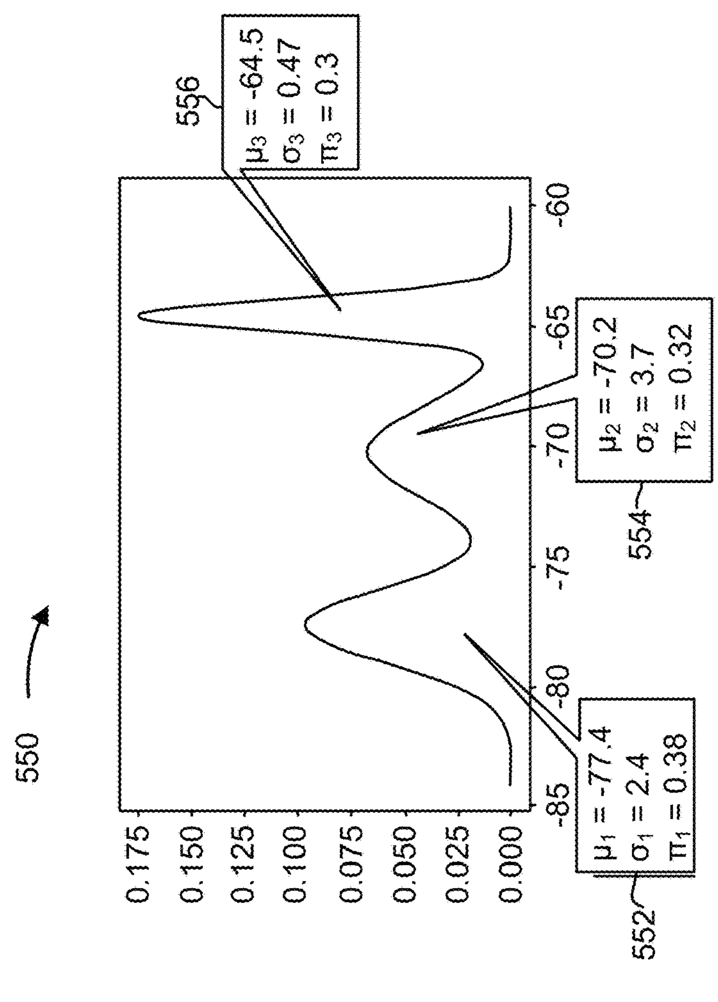
FIGURE 5B

700
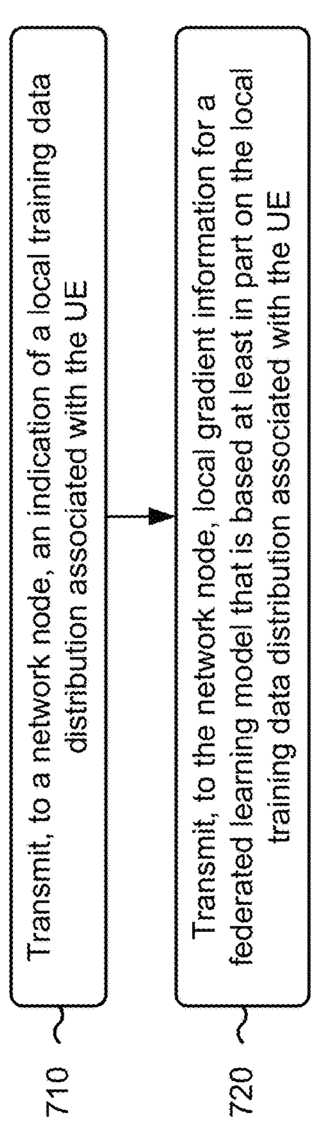
FIGURE 7

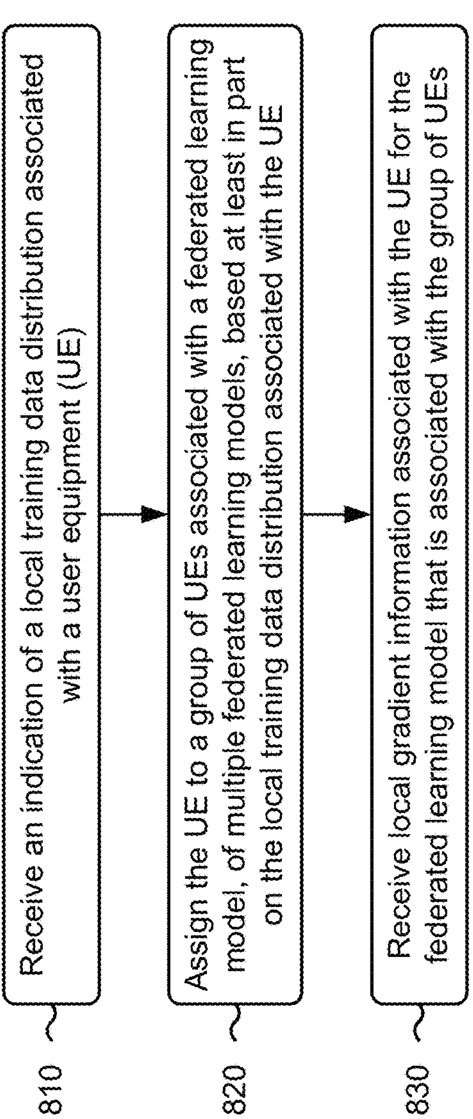
800
810
Receive an indication of a local training data distribution associated with a user equipment (UE)
820
Assign the UE to a group of UEs associated with a federated learning model, of multiple federated learning models, based at least in part on the local training data distribution associated with the UE
830
Receive local gradient information associated with the UE for the federated learning model that is associated with the group of UEs

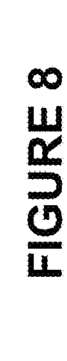
FIGURE 8

USER EQUIPMENT GROUPING FOR FEDERATED LEARNING

FIELD OF THE DISCLOSURE

Aspects of the present disclosure generally relate to wireless communication and specifically to techniques and apparatuses for user equipment (UE) grouping for federated learning.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipment (UEs) to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

Federated learning involves multiple UEs cooperating to train a global machine learning model without sharing their respective local datasets. Federated learning typically relies on gradient descent methods, which are used in training deep networks with good empirical results. In such gradient descent methods, independent and identically distributed (IID) sampling of training data is important to ensure that a local gradient is an unbiased estimate of a global gradient. The accuracy of federated learning algorithms trained on neural network architectures may drop significantly when the local data distributions are skewed (that is, not IID). In a wireless network, such as an NR network, it is unrealistic to assume that local datasets at all UEs are IID. For example, data distributions for local datasets collected by different UEs participating in federated learning can be highly skewed based at least in part on different signal-to-interference-plus-noise ratios (SINRs), environment conditions, scheduling scenarios, and/or operating characteristics, among other examples. Such variation in local data distributions may cause local machine learning models that have the same initial training parameters to converge to different machine learning model parameters. As a result, during federated learning, the divergence between a shared global model acquired by averaging gradients for local models with skewed data distributions and an ideal model (a model obtained when the local datasets are IID) will increase with each iteration, which slows down convergence of the model parameters for the shared global model during federated learning.

SUMMARY

Some aspects described herein relate to a user equipment (UE) for wireless communication. The UE may include at least one memory and at least one processor communicatively coupled with the at least one memory. The at least one processor may be configured to cause the user equipment to transmit, to a network node, an indication of a local training data distribution associated with the UE. The at least one processor may be configured to cause the user equipment to transmit, to the network node, local gradient information for a federated learning model that is based at least in part on the local training data distribution associated with the UE.

Some aspects described herein relate to a network node for wireless communication. The network node may include at least one memory and at least one processor communicatively coupled with the at least one memory. The at least one processor may be configured to cause the network node to receive an indication of a local training data distribution associated with a UE. The at least one processor may be configured to cause the network node to assign the UE to a group of UEs associated with a federated learning model, of multiple federated learning models, based at least in part on the local training data distribution associated with the UE. The at least one processor may be configured to cause the network node to receive local gradient information associated with the UE for the federated learning model that is associated with the group of UEs.

Some aspects described herein relate to a method of wireless communication performed by a UE. The method may include transmitting, to a network node, an indication of a local training data distribution associated with the UE. The method may include transmitting, to the network node, local gradient information for a federated learning model that is based at least in part on the local training data distribution associated with the UE.

Some aspects described herein relate to a method of wireless communication performed by a network node. The method may include receiving an indication of a local training data distribution associated with a UE. The method may include assigning the UE to a group of UEs associated with a federated learning model, of multiple federated learning models, based at least in part on the local training data distribution associated with the UE. The method may include receiving local gradient information associated with the UE for the federated learning model that is associated with the group of UEs.

Some aspects described herein relate to a non-transitory computer-readable medium that stores a set of instructions for wireless communication by a UE. The set of instructions, when executed by one or more processors of the UE, may cause the UE to transmit, to a network node, an indication of a local training data distribution associated with the UE. The set of instructions, when executed by one or more processors of the UE, may cause the UE to transmit, to the network node, local gradient information for a federated learning model that is based at least in part on the local training data distribution associated with the UE.

Some aspects described herein relate to a non-transitory computer-readable medium that stores a set of instructions for wireless communication by a network node. The set of instructions, when executed by one or more processors of the network node, may cause the network node to receive an indication of a local training data distribution associated with a UE. The set of instructions, when executed by one or more processors of the network node, may cause the network node to assign the UE to a group of UEs associated with a federated learning model, of multiple federated learning models, based at least in part on the local training data distribution associated with the UE. The set of instructions, when executed by one or more processors of the network node, may cause the network node to receive local gradient information associated with the UE for the federated learning model that is associated with the group of UEs.

Some aspects described herein relate to an apparatus for wireless communication. The apparatus may include means for transmitting, to a network node, an indication of a local training data distribution. The apparatus may include means for transmitting, to the network node, local gradient information for a federated learning model that is based at least in part on the local training data distribution.

Some aspects described herein relate to an apparatus for wireless communication. The apparatus may include means for receiving an indication of a local training data distribution associated with a UE. The apparatus may include means for assigning the UE to a group of UEs associated with a federated learning model, of multiple federated learning models, based at least in part on the local training data distribution associated with the UE. The apparatus may include means for receiving local gradient information associated with the UE for the federated learning model that is associated with the group of UEs.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIGS. 5A-5B are diagrams illustrating an example associated with UE grouping for federated learning in accordance with the present disclosure.

FIG. 7 is a flowchart illustrating an example process performed, for example, by a UE that supports UE grouping for federated learning in accordance with the present disclosure.

FIG. 8 is a flowchart illustrating an example process performed, for example, by a network node that supports UE grouping for federated learning in accordance with the present disclosure.

DETAILED DESCRIPTION

Figure 1:
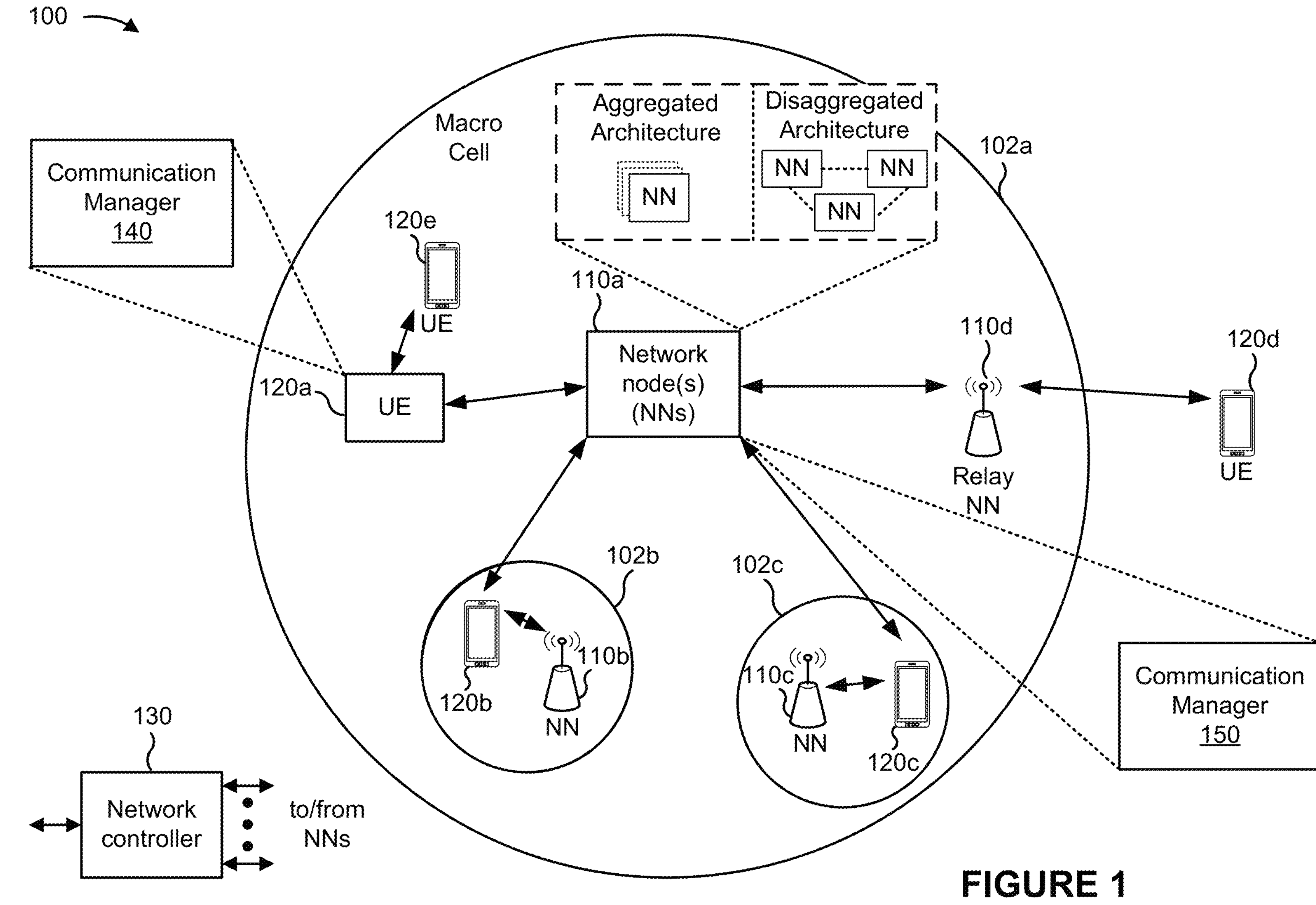
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to grouping user equipments (UEs) for federated learning. Some aspects more specifically relate to grouping UEs into different groups of UEs based at least in part on respective local training data distributions associated with the UEs, and training different federated learning models with the different groups of UEs. In some aspects, each federated learning model may be trained by a respective group of UEs that have the same or similar local training data distributions. In some aspects, different local data distributions may represent different environments and/or different operating conditions. In some aspects, a UE may transmit, to a network node, a local training data distribution associated with the UE. For example, the UE may indicate the local training data distribution as a plurality of Gaussian components of a Gaussian mixture distribution. In another example, the UE may indicate the local training data distribution as a mixture distribution associated with another type of base distribution. In some aspects, the network node may assign the UE to a group of UEs associated with a federated learning model based at least in part on the local training data distribution associated with the UE. In some aspects, the network node may transmit, to the UE, an indication of the federated learning model associated with the group of UEs to which the UE is assigned based at least in part on the indication of the local training data distribution associated with the UE. In some aspects, the UE may transmit, to the network node, local gradient information for the federated learning model that is associated with the group of UEs to which the UE is assigned. In some aspects, the network node may indicate a reporting resource associated with the federated learning model, and the UE may transmit the local gradient information using the indicated reporting resource. In some aspects, the network node may indicate the same reporting resource for each UE in a group of UEs associated with a federated learning model.

Particular aspects of the subject matter described in this disclosure can be implemented to realize one or more of the following potential advantages. In some examples, the described techniques can be used to train different federated learning models using different groups of UEs that are grouped based at least in part on the local training dataset distributions of the UEs. In some examples, training different federated learning models using different groups of UEs that are grouped based at least in part on the local training dataset distributions of the UEs may result in increased accuracy of the trained federated learning models and faster convergence of the trained federated learning models, as compared with training a federated learning model using UEs that are not grouped based on the local training dataset distributions of the UEs. In some examples, indicating, to the network node, the local training dataset distribution associated with a UE as a Gaussian mixture distribution or another type of mixture distribution can be used to reduce a reporting overhead for reporting the local training dataset distribution to the network node. In some examples, indicating, by the network node, the same reporting resource for each UE in a group of UEs associated with a federated learning model can be used to facilitate over the air (OTA) federated learning for the federated learning model based on local gradient information transmitted on the reporting resource by the UEs in the group of UEs.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (for example, three) cells. In some examples, a cell may not necessarily be stationary, and the geographic area of the cell may move according to the location of a network node 110 that is mobile (for example, a mobile network node).

In some aspects, the terms “base station” or “network node” may refer to an aggregated base station, a disaggregated base station, an integrated access and backhaul (IAB) node, a relay node, or one or more components thereof. For example, in some aspects, “base station” or “network node” may refer to a CU, a DU, an RU, a Near-Real Time (Near-RT) RAN Intelligent Controller (RIC), and/or a Non-Real Time (Non-RT) RIC. In some aspects, the terms “base station” or “network node” may refer to one device configured to perform one or more functions, such as those described herein in connection with the network node 110. In some aspects, the terms “base station” or “network node” may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms “base station” or “network node” may refer to any one or more of those different devices. In some aspects, the terms “base station” or “network node” may refer to one or more virtual base stations or one or more virtual base station functions. For example, in some aspects, two or more base station functions may be instantiated on a single device. In some aspects, the terms “base station” or “network node” may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may transmit, to a network node, an indication of a local training data distribution associated with the UE 120; and transmit, to the network node, local gradient information for a federated learning model that is based at least in part on the local training data distribution associated with the UE 120. Additionally or alternatively, the communication manager 140 may perform one or more other operations described herein.

In some aspects, the network node 110 may include a communication manager 150. As described in more detail elsewhere herein, the communication manager 150 may receive an indication of a local training data distribution associated with a UE; assign the UE to a group of UEs associated with a federated learning model, of multiple federated learning models, based at least in part on the local training data distribution associated with the UE; and receive local gradient information associated with the UE for the federated learning model that is associated with the group of UEs. Additionally or alternatively, the communication manager 150 may perform one or more other operations described herein.

Figure 2:
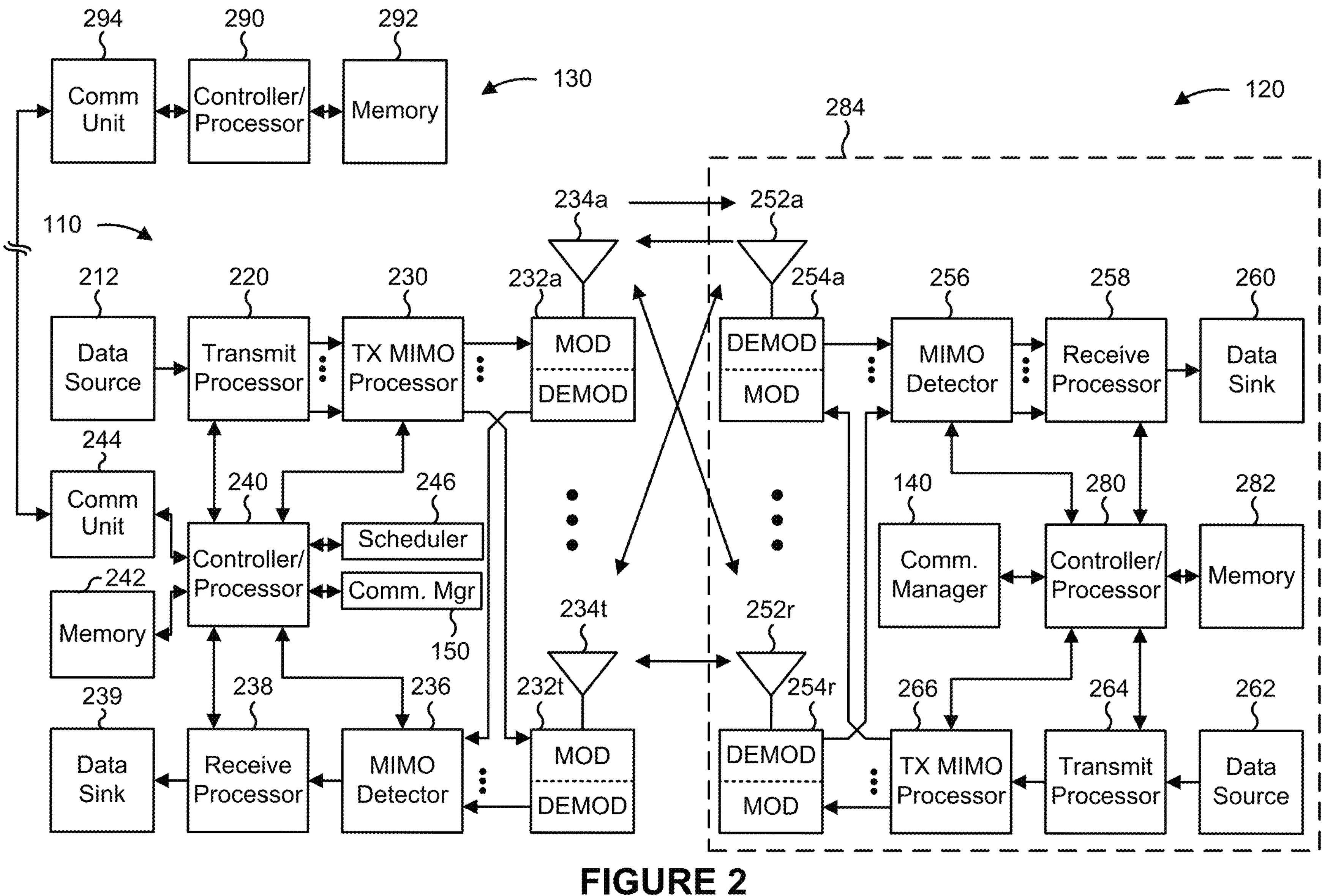
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of depicted in FIG. 2 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the network node 110 or other network nodes 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers and/or one or more processors. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with UE grouping for federated learning, as described in more detail elsewhere herein. For example, the controller/processor 240 of the network node 110, the controller/processor 280 of the UE 120, or any other component(s) of FIG. 2 may perform or direct operations of, for example, process 700 of FIG. 7, process 800 of FIG. 8, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 700 of FIG. 7, process 800 of FIG. 8, or other processes as described herein. In some examples, executing instructions may include running the instructions, converting the instructions, compiling the instructions, or interpreting the instructions, among other examples.

In some aspects, a UE (for example, the UE 120) includes means for transmitting, to a network node, an indication of a local training data distribution associated with the UE; and/or means for transmitting, to the network node, local gradient information for a federated learning model that is based at least in part on the local training data distribution associated with the UE. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (for example, the network node 110) includes means for receiving an indication of a local training data distribution associated with a UE; means for assigning the UE to a group of UEs associated with a federated learning model, of multiple federated learning models, based at least in part on the local training data distribution associated with the UE; and/or means for receiving local gradient information associated with the UE for the federated learning model that is associated with the group of UEs. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, and/or one or more RUs).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
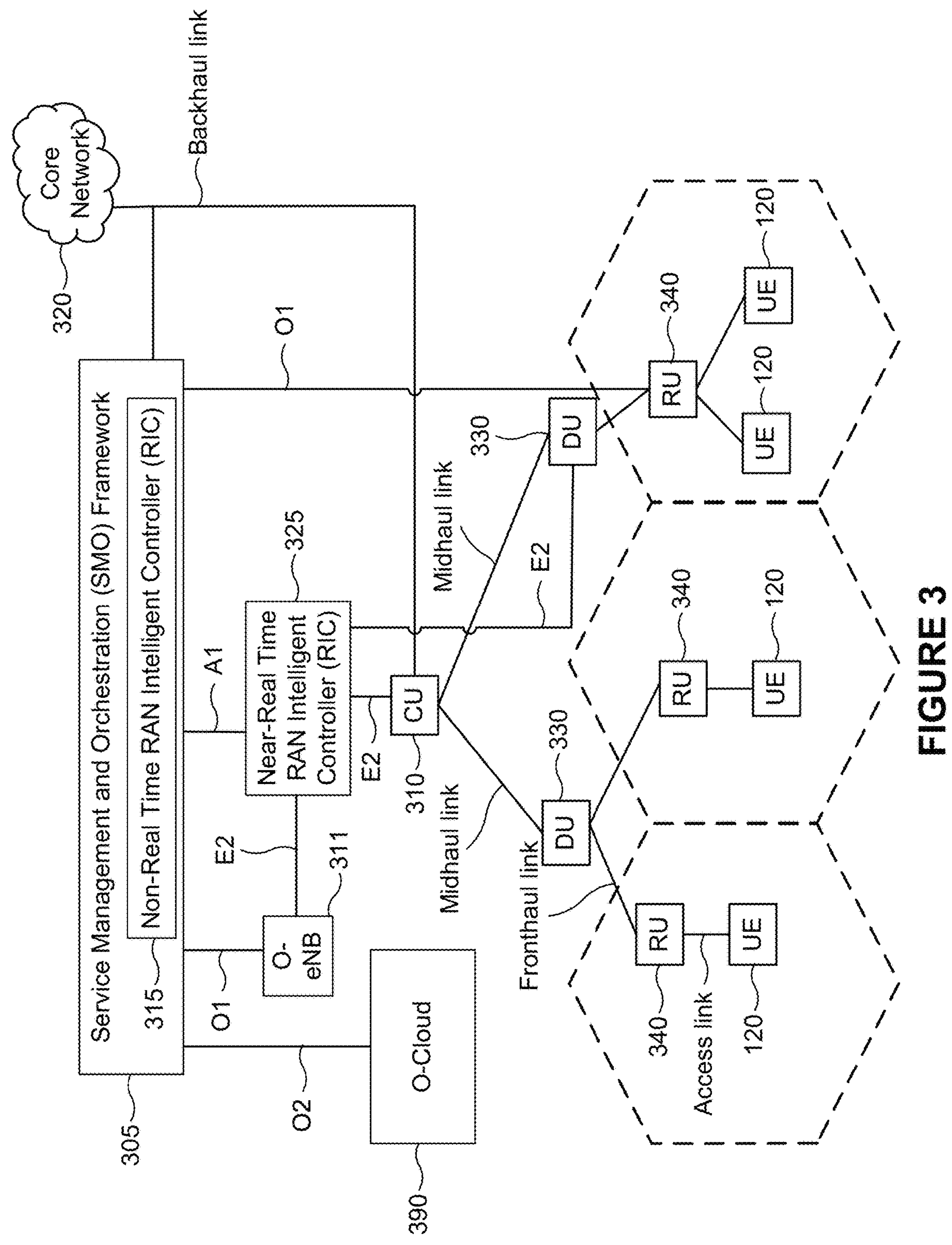
FIG. 3 is a diagram illustrating an example disaggregated base station architecture in accordance with the present disclosure.

FIG. 3 is a diagram illustrating an example disaggregated base station architecture 300 in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), and/or control plane functionality (for example, Central Unit-Control Plane (CU-CP) functionality). In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle OTA communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

Figure 4:
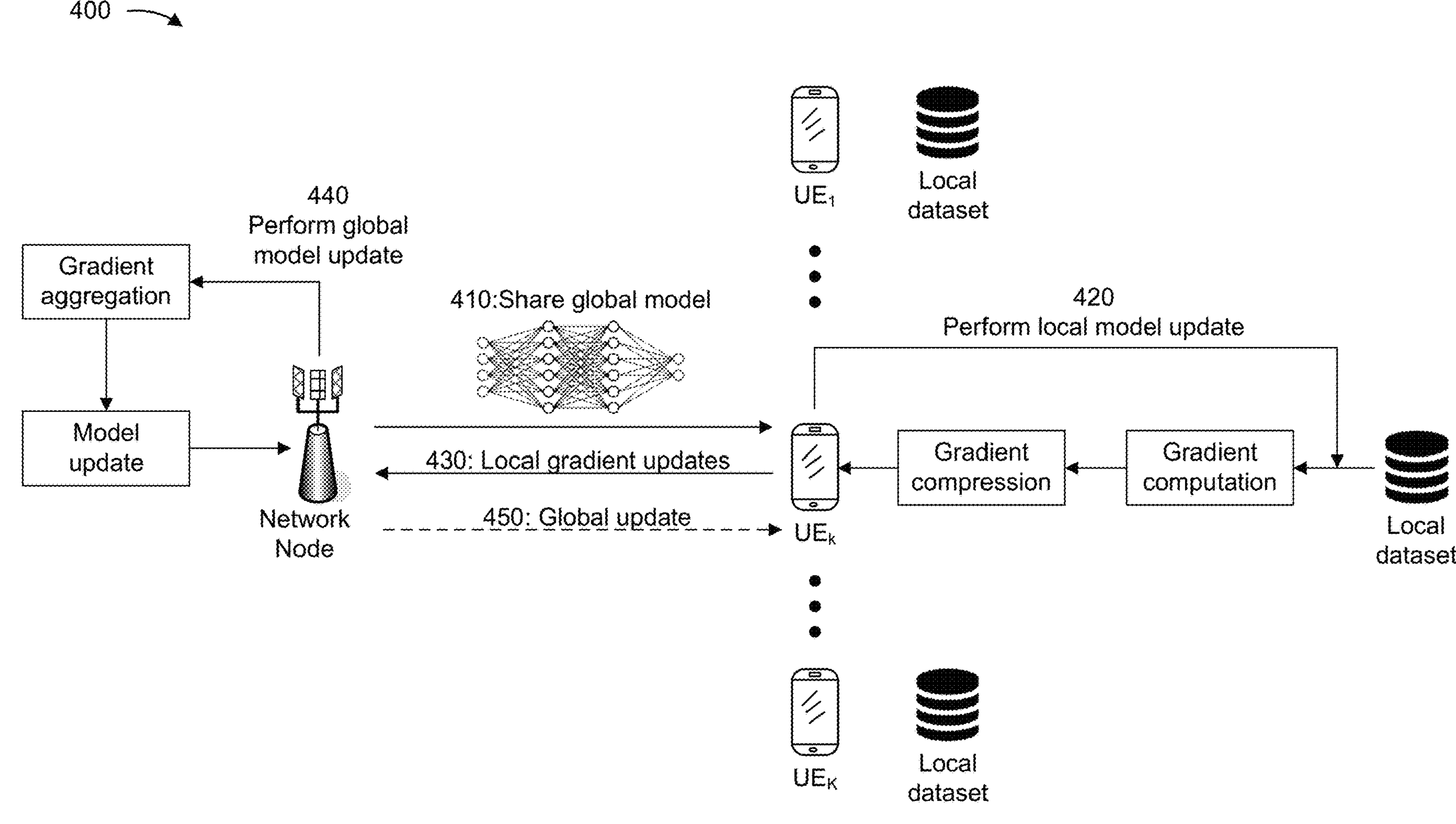
FIG. 4 is a diagram illustrating an example of federated learning in a wireless network in accordance with the present disclosure.

FIG. 4 is a diagram illustrating an example 400 associated with federated learning in a wireless network, in accordance with the present disclosure.

Machine learning components may be used to perform a variety of different types of operations. A machine learning component is a software component of a device (for example, a client device, a server device, a UE, and/or a network node) that performs one or more machine learning procedures and/or that works with one or more other software and/or hardware components to perform one or more machine learning procedures in a machine learning mode. In some examples, a machine learning component may include, for example, software that may learn to perform a procedure without being explicitly trained to perform the procedure. A machine learning component may include, for example, a feature learning processing block (for example, a software component that facilitates processing associated with feature learning) and/or a representation learning processing block (for example, a software component that facilitates processing associated with representation learning). A machine learning component may include one or more neural networks, one or more classifiers, and/or one or more deep learning models, among other examples.

In some examples, machine learning components may be distributed in a network. For example, a server device may provide a machine learning component to one or more client devices. The machine learning component may be trained using federated learning. Federated learning (also known as collaborative learning) is a machine learning technique that enables multiple clients to collaboratively train machine learning components in a decentralized manner. In federated learning, a client device may use local training data to perform a local training operation associated with the machine learning component. For example, the client device may use local training data to train the machine learning component. Local training data is training data that is generated by, collected by, and/or stored at the client device without being exchanged with other nodes that are participating in the federated learning.

In federated learning, a client device may generate a local update associated with the machine learning component based at least in part on the local training operation. A local update is information associated with the machine learning component that reflects a change to the machine learning component that occurs as a result of the local training operation. For example, a local update may include the locally updated machine learning component (for example, updated as a result of the local training operation), data indicating one or more aspects (for example, parameter values, output values, weights) of the locally updated machine learning component, a set of gradients associated with a loss function corresponding to the locally updated machine learning component, and/or a set of parameters (for example, neural network weights) corresponding to the locally updated machine learning component, among other examples.

In federated learning, the client device may provide the local update to the server device. The server device may collect local updates from one or more client devices and use the local updates to update a global version of the machine learning component that is maintained at the server device. An update associated with the global version of the machine learning component that is maintained at the server device may be referred to as a global update. A global update is information associated with the machine learning component that reflects a change to the machine learning component that occurs based at least in part on one or more local updates and/or a server update. A server update is information associated with the machine learning component that reflects a change to the machine learning component that occurs as a result of a training operation performed by the server device. In one or more examples, a server device may generate a global update by aggregating a number of local updates to generate an aggregated update and applying the aggregated update to the machine learning component.

In some aspects, after collecting the local updates from the client device(s) and using the local updates to update the global version of the machine learning component, the server device may provide the global update to the client device(s). A client device may apply a global update received from a server device to the machine learning component (for example, to the locally-stored copy of the machine learning component). In this way, a number of client devices may be able to contribute to the training of a machine learning component and a server device may be able to distribute global updates so that each client device maintains a current, updated version of the machine learning component. Federated learning also may facilitate privacy of training data because the server device may generate global updates based on local updates and without collecting the local training data associated with the client devices.

In some cases, the exchange of information in federated learning may be performed over wireless local area network (WLAN) connections, where limited and/or costly communication resources may be of relatively low concern due to wired connections associated with modems, routers, and/or other network infrastructure. However, implementing federated learning using machine learning components in a cellular context may improve network performance and user experience in a wireless network. In the cellular context, for example, a server device may be, include, or be included in a network node, and a client device may be, include, or be included in a UE. In some examples, the server device may be an edge server at an edge of a core network, and the edge server may be, include, be included in, or be in communication with a network node. Accordingly, in a wireless network, such as an LTE network or an NR network, a UE operating in a network may utilize a machine learning component for any number of different types of operations, transmissions, and/or user experience enhancements, among other examples. For example, in some cases, a network node may configure a UE to perform one or more tasks (for example, related to wireless communication, positioning, and/or user interface interactions, among other examples) in a machine learning mode and to report information associated with the machine learning tasks to the network node. For example, in the machine learning mode, a UE may be configured to obtain measurements associated with downlink reference signals (for example, a channel state information reference signal (CSI-RS), transmit an uplink reference signal (for example, a sounding reference signal (SRS)), measure reference signals during a beam management process for providing channel state feedback (CSF) in a channel state information (CSI) report, measure received power of reference signals from a serving cell and/or neighbor cells, measure signal strength of inter-radio access technology (for example, WLAN) networks, measure sensor signals for detecting locations of one or more objects within an environment, and/or collect data related to user interactions with the UE, among other examples. In this way, federated learning may enable improvements to network performance and/or user experience by leveraging the local machine learning capabilities of one or more UEs.

For example, as shown in FIG. 4, federated learning for machine learning components may be performed by a network node communicating with a set of K UEs (shown as "$UE_1, \ldots, UE_k, \ldots,$ and $UE_K$") that are participating in federated learning. The network node and the UEs may communicate with one another via a wireless network (for example, the wireless network 100 shown in FIG. 1). In some aspects, any number of additional UEs may be included in the set of K UEs. The network node may be, include, be included in, or be in communication with an edge server, such as a parameter server.

As shown in FIG. 4, in a first operation 410, the network node may share a global federated learning model (for example, a machine learning component) with the K UEs that are participating in federated learning. For example, in some aspects, the network node may transmit the global federated learning model to the UEs on a downlink, or the network node may transmit information to the UEs that indicates a network location where the UEs are to download or otherwise obtain the federated learning model. In some aspects, each UE participating in the federated learning may be configured to perform one or more wireless communication tasks and/or one or more user interface tasks in a machine learning mode in order to train a local version of the federated learning model.

In some aspects, in a second operation 420, the UEs participating in the federated learning may perform a local model update by locally training the federated learning model using local training data collected by the UEs, respectively. A UE may train a federated learning model, such as a neural network, by optimizing a set of model parameters, $w^{(n)}$, associated with the federated learning model, where n is a federated learning round index. The UEs participating in the federated learning may be configured to provide updates to the network node one or more times (for example, periodically, on demand, and/or upon updating the local version of the federated learning model, among other examples). For example, the UEs may be configured to perform federated learning rounds in which the set of model parameters are optimized using the local training data, and an update is provided to the network node until a global federated learning accuracy requirement is satisfied (for example, until a global federated learning algorithm converges).

As described herein, a "federated learning round" (or "federated learning iteration") refers to the local training performed by the UE that corresponds to an update provided by the UE to the network node. In some examples, "federated learning round" may refer to the transmission by a UE, and the reception by the network node, of an update to the federated learning model. The federated learning round index n may indicate a number of federated learning rounds since the most recent global update was transmitted from the network node to the UE. The initial provisioning of a federated learning model on a UE and/or the transmission of a global update to the federated learning model to a UE may trigger the beginning of a new federated learning round. In some examples, at each federated learning iteration, the network node may transmit/broadcast a global training parameter vector for the federated learning model to the UEs. Each UE may then estimate a gradient that minimizes a loss function on a batch of a local dataset associated with that UE.

In some examples, a UE participating in a federated learning round may determine an update corresponding to the federated learning model by training the federated learning model. In some examples, as shown, the UEs may collect local training data and store the local training data in a memory device. The stored training data may be referred to as a "local dataset," which the UEs may use to perform the local update associated with the federated learning model.

In some examples, a UE may access the local training data (for example, the local dataset) from the memory device and use the local training data to determine an input vector, $x_j$, to be input into the federated learning model to generate a training output, $y_j$, from the federated learning model. The input vector $x_j$ may include an array of input values, and the training output $y_j$ may include a value (for example, a value between 0 and 9).

In some examples, the training output $y_j$ may be used to facilitate determining the model parameters $w^{(n)}$ that maximize a variational lower bound function. A negative variational lower bound function, which is the negative of the variational lower bound function, may correspond to a local loss function, $F_k(w)$ which may be expressed as:

$$F_k(w) = \frac{1}{|D_k|} \sum\nolimits_{(x_j, y_j) \in D_k} f(w, x_j, y_j),$$

where $|D_k|$ is the size of the local dataset $D_k$ associated with $UE_k$. In some aspects, a stochastic gradient descent (SGD) algorithm may be used to optimize the model parameters $w^{(n)}$ in a decentralized manner. For example, each UE may perform one or more SGD procedures to determine the optimized parameters $w^{(n)}$ and may perform a gradient computation to determine the gradients, $$g_k^{(n)} = \nabla F_k\left(w^{(n)}\right),$$

of the local loss function F(w). The UEs may further refine the federated learning model based at least in part on the value of the local loss function and/or the gradients, among other examples. As further shown in FIG. 4, in some examples, a UE may perform gradient compression to generate a compressed set of gradients, $$\tilde{g}_k^{(n)} = q\left(g_k^{(n)}\right),$$

where q represents a compression scheme applied to the set of gradients $$g_k^{(n)}.$$

In this way, by performing one or more iterations of the SGD algorithm to train the federated learning model and determine the gradients $$g_k^{(n)},$$

a UE may determine a local update corresponding to the federated learning model. Each repetition of the local training procedure described herein may be referred to as an epoch. In some examples, the local update may include an updated set of model parameters $w^{(n)}$, a difference between the updated set of model parameters $w^{(n)}$ and a prior set of model parameters $w^{(n-1)}$, the set of gradients $$g_k^{(n)},$$

and/or an updated federated learning model (for example, an updated neural network model), among other examples.

In a third operation 430, the UEs may transmit, to the network node, respective local gradient updates to the federated learning model. In some examples, the local gradient update transmitted by a particular UE may include the local gradient update determined by the UE or a compressed version of the local gradient update determined by the UE. For example, in some aspects, a UE may feed back the gradient vectors $$g_k^{(n)}$$

computed by the UE or a compressed set of gradients $$\tilde{g}_k^{(n)}$$

generated by applying a compression scheme to the set of gradients $$g_k^{(n)}.$$

In some examples, for digital federated learning, each UE may compress the respective local gradients $$g_k^{(n)}$$

and transmit the respective compressed set of local gradient $$\tilde{g}_k^{(n)}$$

to the network node using a multi-access scheme. In some other examples, for analog federated learning (also referred to as OTA federated learning), the local gradients $$g_k^{(n)}$$

at each UE may be rescaled to satisfy a power constraint and to mitigate the effect of channel noise, and aggregation of the local gradients may be performed over the air. In such examples, the gradient compression to generate the compressed set of gradients may be performed as $$\tilde{g}_k^{(n)} = \text{sign}\left(g_k^{(n)}\right).$$

As described above, a "round" may generally refer to the process of generating a local update at a UE and providing the local update to the network node. In some examples, a "round" may refer to the training, generation, and uploading of local updates by all of the UEs in a set of UEs participating in a federated learning procedure. The round may include the procedure described herein in which the network node aggregates the local gradient updates from various UEs and determines a global gradient update based at least in part on the aggregated local updates. In some examples, the round may include transmitting the global update to the UEs. In some examples, a round may include any number of epochs performed by one or more UEs.

As shown in FIG. 4, in a fourth operation 440, the network node may perform a global model update by aggregating the feedback received from the UEs related to the local updates applied by the UEs. For example, as shown, the network node may average the received gradients (or compressed gradient values) to determine an aggregated gradient update, resulting in a global gradient, which may be expressed as $$v^{(n)} = \frac{1}{K}\sum_{k=1}^{K}\tilde{g}_k^{(n)},$$

where, as explained above, K is the total number of UEs participating in federated learning (for example, a number of UEs that provided local updates to the network node). In some examples, the network node may aggregate the local updates received from the UEs participating in federated learning using any suitable aggregation technique. As further shown in FIG. 4, the network node may update the global federated learning model based on the aggregated (for example, averaged) local updates. In some aspects, for example, the network node may update the global federated learning model by normalizing a size of the local datasets by treating each dataset size, $|D_k|$, as being equal. The network node may update the global federated learning model using multiple rounds of local updates from the UEs until a global federated learning accuracy requirement is satisfied (for example, until a global federated learning algorithm converges). For example, in some aspects, the process of sharing the global federated model with the UEs, performing local updates through a decentralized SGD algorithm, and updating the global federated model based on aggregated local updates may be repeated until a global loss function is minimized, where the global loss function may be given by:

$$F(w) = \frac{\sum_{k=1}^{K}\sum_{j\in D_k} f_j(w)}{K*D} = \frac{1}{K}\sum_{k=1}^{K} F_k(w),$$

where $|D_k|=D$, and where D is a normalized constant.

In some examples, such as for OTA federated learning, the network node may aggregate the local gradient updates received from the UEs as $$y^{(n)} = \sum_{k=1}^{K}\tilde{g}_k^{(n)}.$$

The network node may then apply a majority voting scheme to determine the global gradient $v^{(n)}$ based on the aggregated local gradients $y^{(n)}$ as $v^{(n)}=\text{sign}(y^{(n)})$.

In some examples, in a fifth operation 450, the network node may transmit an update associated with the updated global federated learning model to the UEs. In some examples, the network node may transmit or broadcast, to the UEs, an updated global training parameter vector w for the federated learning model. In other examples, the network node may transmit or broadcast, to the UEs, the global gradient $v^{(n)}$ to enable each UE to update the federated learning model. For example, in each round or iteration, each UE may update parameters of the federated learning model as $w^{(n)}=w^{(n)}-\eta\cdot v^{(n-1)}$.

As described above, in federated learning, multiple UEs cooperate to train a global machine learning model without sharing their respective local datasets. Each UE collects the respective dataset associated with that UE and determines respective local gradients to minimize a global loss function. The network node aggregates the respective local gradients determined by the UEs to obtain a global gradient, and the global gradient is used to update the global training parameter vector. Because only the local gradients determined by each UE are shared with the network node, and not each UE's local dataset, federated learning protects the privacy of each UE's local dataset. Furthermore, central machine learning model training may be inefficient in terms of storage and/or computation, and federated learning provides natural parallelization for training, which reduces centralized storage resources and computational resources used for machine learning model training.

Federated learning typically relies on gradient descent methods (for example, SGD), which are used in training deep networks with good empirical results. In such gradient descent methods, independent and identically distributed (IID) sampling of the training data is important to ensure that a local gradient is an unbiased estimate of a full/global gradient. In some examples, the accuracy of federated learning algorithms trained on neural network architectures can drop by 55% when the local data distributions are skewed (that is, not IID). In a wireless network, such as an NR network, it is unrealistic to assume that local datasets at all UEs are IID. For example, data distributions for local datasets collected by different UEs participating in federated learning can be highly skewed based at least in part on different signal-to-interference-plus-noise ratios (SINRs), environment conditions (for example, rural versus urban, high Doppler versus low Doppler, and/or high interference versus low interference, among other examples), scheduling scenarios, and/or operating characteristics (for example, bandwidth, frequency band, beams, and/or numerology, among other examples), among other examples. Such variation in local data distribution may cause local models that have the same initial training parameters to converge to different machine learning models. As a result, during federated learning, the divergence between the shared global model acquired by averaging the gradients for local models with skewed data distributions and an ideal model (a model obtained when the local datasets are IID) will increase with each iteration, which slows down convergence of the model parameters and decreases the accuracy of the trained machine learning model.

Various aspects relate generally to grouping UEs for federated learning. Some aspects more specifically relate to grouping UEs into different groups of UEs based at least in part on respective local training data distributions associated with the UEs, and training different federated learning models with the different groups of UEs. In some aspects, a UE may transmit, to a network node, a local training data distribution associated with the UE. In some aspects, the UE may transmit, to the network node, local gradient information for a federated learning model that is based at least in part on the local training data distribution associated with the UE. In some aspects, the network node may assign the UE to a group of UEs associated with the federated learning model that is based at least in part on the local training data distribution associated with the UE.

Particular aspects of the subject matter described in this disclosure can be implemented to realize one or more of the following potential advantages. In some examples, the described techniques can be used to train different federated learning models using different groups of UEs that are grouped based at least in part on the local training dataset distributions of the UEs. In some examples, training different federated learning models using different groups of UEs that are grouped based at least in part on the local training dataset distributions of the UEs may result in increased accuracy of the trained federated learning models and faster convergence of the trained federated learning models, as compared with training a federated learning model using UEs that are not grouped based on the local training dataset distributions of the UEs.

Figure 5A:
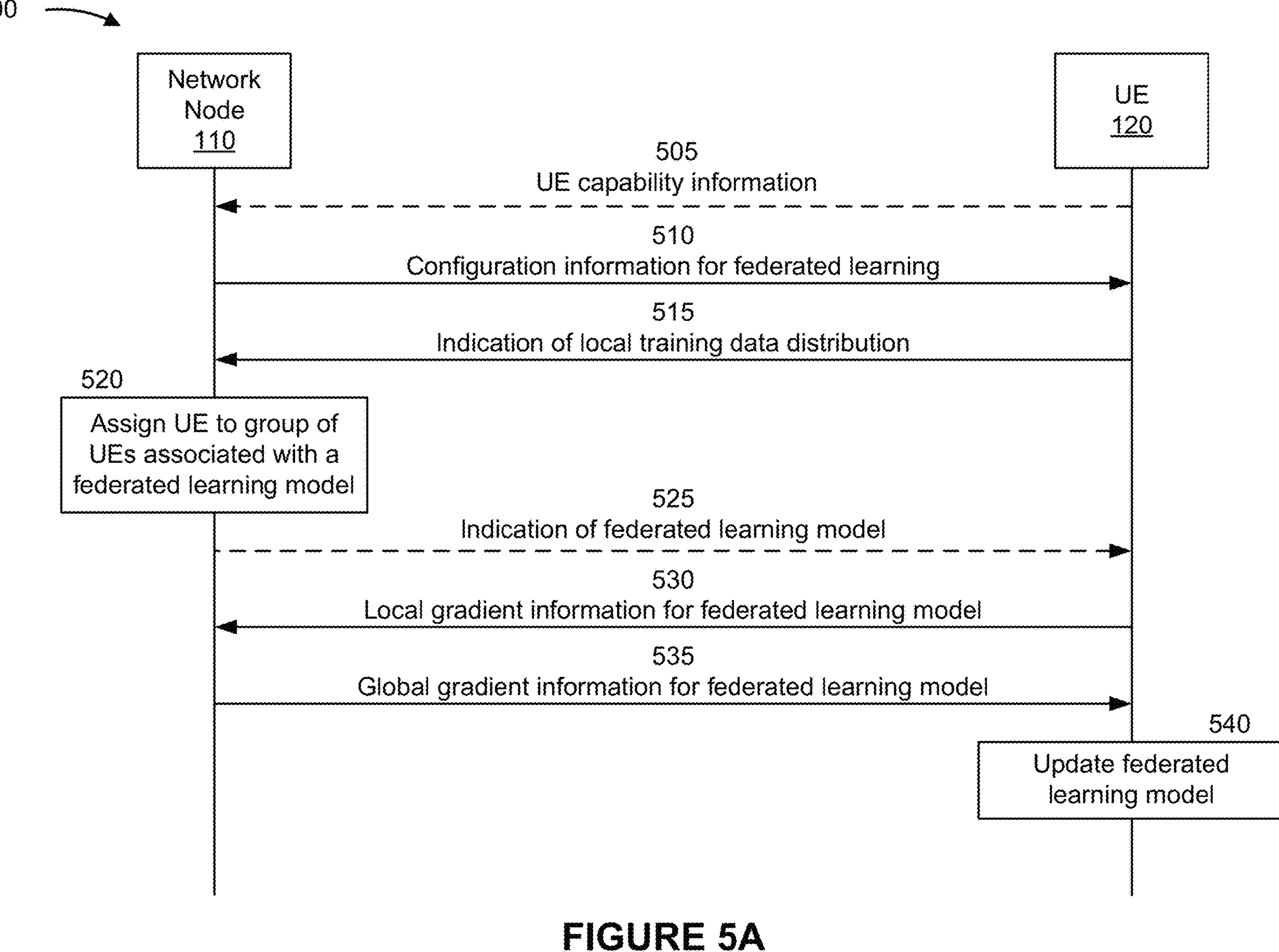

FIGS. 5A-5B are diagrams illustrating an example 500 associated with UE grouping for federated learning, in accordance with the present disclosure. As shown in FIG. 5A, example 500 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As shown in FIG. 5A, in a first operation 505, the UE 120 may transmit, to the network node 110, UE capability information. The network node 110 may receive the UE capability information. In some aspects, the UE capability information may relate to a capability of the UE 120 for federated learning. For example, the UE capability information may indicate that the UE 120 is capable of participating in training a federated learning model.

In some aspects, the UE capability information may indicate a capability of the UE 120 for reporting a local training data distribution associated with the UE 120. For example, the UE capability information may indicate a capability of the UE 120 for reporting the local training data distribution as the mixture distribution. In such examples, the UE capability information may indicate whether the UE 120 is capable of reporting the local training data distribution as a mixture distribution. The UE capability information may further indicate a capability for a base distribution supported by the UE 120 for reporting the local training data distribution as a mixture distribution. For example, the UE capability information may indicate one or more base distributions (for example, a Gaussian distribution, a uniform distribution, an exponential distribution, and/or an inverse Gaussian distribution, among other examples) supported by the UE 120 for reporting the local training data distribution as a mixture distribution. In some aspects, the UE capability information may indicate a capability for a maximum quantity of components that the UE 120 is capable of estimating for the mixture distribution. For example, the UE capability information may indicate a capability of the UE 120 with respect to a respective maximum quantity of components for each base distribution supported by the UE 120.

As further shown in FIG. 5A, in a second operation 510, the network node 110 may transmit, and the UE 120 may receive, configuration information for federated learning. For example, the configuration information may be included in an RRC message, a MAC control element (MAC-CE), or downlink control information (DCI).

In some aspects, the configuration information may include configuration information that configures reporting of the local training dataset distribution associated with the UE 120. In such examples, the configuration information that configures reporting of the local training dataset distribution associated with the UE 120 may be based at least in part on the UE capability information that indicates a capability of the UE 120 for reporting the local training data distribution associated with the UE 120. In some aspects, the configuration information may indicate a format for reporting the local training dataset distribution and/or uplink resources (for example, physical uplink shared channel (PUSCH) and/or physical uplink control channel (PUCCH) resources) to be used by the UE 120 to report the local training dataset distribution. In some aspects, the configuration information may configure the UE 120 to report a respective input training data distribution for each of one or more inputs in a local dataset associated with the UE 120. Additionally or alternatively, the configuration information may configure the UE 120 to report an output training data distribution for an output in the local dataset associated with the UE 120. In some aspects, the configuration information may indicate one or more statistical properties (for example, mean, mode, variance, and/or k-th order moment, among other examples) associated with the local training data distribution to be reported by the UE 120 (for example, a respective set of one or more statistical properties for each input and/or output training data distribution). In some aspects, the configuration information may configure the UE 120 to report a P-value associated with the local training data distribution.

In some aspects, the configuration information may configure mixture distribution parameters for reporting the local training dataset distribution as a mixture distribution. In such examples, the configuration information may indicate a base distribution to be used for the mixture distribution reporting of the local training dataset distribution. The local training dataset of the UE 120 may include multiple inputs to be used for federated learning based training of a machine learning model. In such examples, the data distribution of the local training dataset may have multiple dimensions (for example, corresponding to respective input training data distributions for the multiple inputs and an output training data distribution for an output), and reporting the input and output training data distributions may be associated with a high reporting overhead. In some aspects, based at least in part on knowledge of the environment conditions for the UE 120, the network node 110 may configure mixture distribution reporting of the local training dataset distribution and set the base distribution to reduce the reporting overhead associated with reporting the local training dataset distribution. For example, the base distribution may be a Gaussian distribution, a uniform distribution, an exponential distribution, or an inverse Gaussian distribution, among other examples. The configuration information may also indicate a maximum number of components for the mixture distribution reporting of the local training dataset distribution and/or a minimum mixing probability for the components to be reported by the UE 120. The parameter for the maximum number of components and/or the parameter for the minimum mixing probability may be set, by the network node 110, to configure a trade-off between accuracy of the reported local training data distribution and the reporting overhead for reporting the local training data distribution.

In some aspects, the configuration information may configure multiple federated learning models and/or multiple federated learning reporting resources for the UE 120. In some aspects, the configuration may indicate multiple federated learning models and a respective federated learning model index associated with each federated learning model. In such examples, the configuration information may also indicate a respective federated learning reporting resource (for example, an uplink time and/or frequency resource) associated with each federated learning model, to be used by the for reporting local gradient information for the federated learning model (for example, for OTA aggregation of the local gradient information).

In some other aspects, the configuration information may indicate multiple separate federated learning reporting resources (for example, for OTA aggregation) for the UE 120, and the configuration information may indicate a respective data distribution parameter associated with each federated learning reporting resource. For example, the multiple federated learning reporting resources indicated in the configuration information may include respective federated learning reporting resources (for example, uplink time and/or frequency resources) associated with multiple federated learning models. In such examples, the respective data distribution parameter for each federated learning reporting resource may indicate a data distribution class (for example, representing a training data distribution or a range of training data distributions), and the configuration information may configure the UE 120 to use the configured federated learning resource with the data parameter that indicates a data class of the local training data distribution associated with the UE 120.

In some other aspects, the configuration information may indicate multiple federated learning models for the UE 120, and the configuration information may indicate a respective data distribution parameter associated with each federated learning model. In such examples, the respective data distribution parameter for each federated learning model may indicate a respective data distribution class (for example, representing a training data distribution or a range of training data distributions) associated with each federated learning model.

In some other aspects, the configuration information may indicate a condition associated with a federated learning model. In such examples, the configuration information may configure the UE 120 to participate in training the federated learning model (or switch to training the federated learning model) based at least in part on the condition being satisfied. Local training datasets obtained in different scheduling and/or RF configurations may have different properties. The network node 110 and/or other network devices may train multiple federated learning models, with each federated learning model corresponding to a different scheduling and/or RF configuration. In some aspects, the configuration information may indicate respective conditions associated with multiple federated learning models. In this case, the respective condition associated with each federated learning model may indication at least one of a scheduling condition or an RF configuration condition. In some examples, the UE 120 may have multiple modes corresponding to different scheduling and/or RF configurations, and the UE 120 may only participate in training of a federated learning model if one or more conditions associated with the federated learning model (for example, a condition based on the RF configuration of the UE 120 and/or a condition based on the scheduling for the UE 120 by the network node 110) are satisfied.

As further shown in FIG. 5A, in a third operation 515, the UE 120 may transmit, to the network node 110, an indication of the local training data distribution associated with the UE 120. The local training data distribution associated with the UE 120 may be a data distribution (or multiple data distributions) of a local training dataset collected by the UE 120. The local training dataset may include training data for training a machine learning model (for example, a federated learning model) and testing data for testing the machine learning model. The local training dataset may include input data for one or multiple training inputs to a machine learning model and output data for training output. The local training data distribution may include a respective input data distribution for each training input and an output data distribution for the training output. In some aspects, the UE 120 may transmit the indication of the local training data distribution associated with the UE 120 based at least in part on the configuration information that configures reporting of the local training data distribution. For example, the UE 120 may transmit the indication of the local training data distribution associated with the UE 120 to the network node 110 via an uplink transmission in uplink resource, such as a PUSCH or PUCCH resource.

In some aspects, the indication of the local training data distribution may indicate one or more statistical properties associated with the local training data distribution. For example, the one or more statistical properties may include one or more of a mean, a mode, a variance, and/or a k-th order moment, among other examples, of the data included in the local training dataset associated with the UE 120. In some aspects, the indication of the local training dataset associated with the UE 120 may indicate a P-value associated with the local training dataset. For example, a P-value that is greater than or equal to 0.05 may indicate that the local training dataset associated with the UE 120 has a normal distribution, and a P-value that is less than 0.05 may indicate that the local training dataset associated with the UE 120 does not have a normal distribution.

In some aspects, the UE 120 may report local training data distribution (for example, the input and/or output training data distributions) as a mixture distribution. By reporting the local training data distribution (for example, the input and/or output training data distributions) as a mixture distribution, the UE 120 may reduce a reporting overhead associated with reporting the local training data distribution. A mixture distribution may represent each data distribution as a mixture of common base distributions (for example, a mixture of Gaussian distributions or another base distribution). For example, the indication of the local training data distribution may indicate the local training data distribution as a mixture distribution including one or more components associated with a base distribution (for example, the base distribution indicated in the configuration information).

In some aspects, the UE 120 may indicate the local training data distribution (for example, each respective input and/or output data distribution of the local training dataset) as a Gaussian mixture distribution. For example, the base distribution for the mixture distribution may be a Gaussian distribution. The Gaussian mixture distribution may include multiple Gaussian components, identified by $k \in \{1, \ldots, K\}$, where K is the number of Gaussian components, and the data distribution is given by $$p(X) = \sum_{k=1}^{K} \pi_k \mathbb{G}\left(X \mid \mu_k, \sum_k\right).$$

Each Gaussian component may include a respective mean $\mu_k$, a respective covariance matrix $\Sigma_k$, and a respective mixing probability $\pi_k$. The covariance matrix $\Sigma_k$ may define a correlation across different data features. The mixing probability $\pi_k$ may define a respective weight of each Gaussian component $$\left(\sum_{k=1}^{K} \pi_k = 1\right).$$

In some aspects, the indication of the local training data distribution (for example, for each respective input and/or output data distribution) may indicate a plurality (K) of Gaussian components, and for each Gaussian component, the indication may include the respective mean $\mu_k$, the respective covariance matrix $\Sigma_k$, and the respective mixing probability $\pi_k$. In such examples, the UE 120 may estimate the mean $\mu_k$, the covariance matrix $\Sigma_k$, and the mixing probability $\pi_k$ for each Gaussian component based at least in part on the local training data distribution (for example, to fit the Gaussian mixture model to the local training data distribution).

FIG. 5B shows an example of representing a data distribution 545 using a Gaussian mixture distribution 550. For example, the data distribution 545 shown in FIG. 5B is a data distribution observed at a UE (for example, the UE 120) using system level simulations. The Gaussian mixture distribution 550 shown in FIG. 5B is fitted to the data distribution 545 using 3 Gaussian components 552, 554, and 556. For example, each Gaussian component 552, 554, and 556 includes a respective mean $\mu$ respective covariance $\sigma$, and a respective weighting probability $\pi$.

In some other aspects, the UE 120 may indicate the local training data distribution (for example, each respective input and/or output data distribution of the local training dataset) as a mixture distribution with a base distribution other than a Gaussian distribution. For example, the base distribution may be at least one of a uniform distribution, an exponential distribution, or an inverse Gaussian distribution, among other examples. In such examples, the indication of the local training data distribution may indicate a mixture distribution that includes K components associated with the base distribution. For each component of the K components associated with the base distribution, the indication of the local training data distribution may indicate one or more parameters associated the base distribution and a mixing probability. For example, the one or more parameters of the inverse Gaussian distribution may include a mean and a shape parameter. That is, for mixture distribution with a base distribution of the inverse Gaussian distributions, each component may include a respective mean, a respective shape parameters, and a respective mixing probability. In another example, the one or more parameters of the exponential distribution may include a distribution rate $\lambda$. That is, for mixture distribution with a base distribution of the exponential distribution, each component may include a respective distribution rate $\lambda$ and a respective mixing probability.

Returning to FIG. 5A, in a fourth operation 520, the network node 110 may assign the UE 120 to a group of UEs associated with a federated learning model based at least in part on the local training data distribution associated with the UE 120. The network node 110 may receive indications of respective local training data distributions associated with multiple different UEs. The network node 110 may group the UEs into multiple different groups of UEs based at least in part on the respective local training data distributions associated with the UEs. In some aspects, the network node 110 may assign UEs with similar local training data distributions to the same group of UEs. For example, different groups of UEs may correspond to different local training data distributions or different ranges of local training data distributions. In such examples, the network node 110 may assign the UE 120 to a group of UEs with similar local training data distributions as the UE 120. In some examples, the different groups of UEs (associated with different groupings based on local training data distributions) may be associated with different federated learning models. For example, gradient information from the UEs in each group of UEs may only be used for training the respective federated learning model associated with that group of UEs.

As further shown in FIG. 5A, in some aspects, a fifth operation 525, the network node 110 may transmit, and the UE 120 may receive, an indication of the federated learning model that is based at least in part on the local training data distribution associated with the UE 120. In such examples, the network node 110 may transmit, and the UE 120 may receive, an indication of the federated learning associated with the group of UEs to which the UE 120 is assigned. In some aspects, the network node 110 may transmit to the UE 120 that identifies the federated learning model associated with the group of UEs to which the UE 120 is assigned. For example, the network node 110 may transmit, and the UE 120 may receive an indication of a federated learning model index associated with the federated learning model. In such examples, the federated learning model index may indicate a federated learning model among multiple federated learning models configured for the UE 120. In some examples, the indication transmitted by the network node 110 may also indicate a federated learning reporting resource to be used by the UE 120 to report local gradient information for the indicated federated learning model. In some other examples, the UE 120 may determine a federated learning reporting resource for the indicated federated learning model from the configuration information based at least in part on the federated learning model index.

In some aspects, the network node 110 may transmit, and the UE 120 may receive, an indication of a federated learning reporting resource (for example, an uplink time and/or frequency resource) associated with the federated learning model that is based at least in part on the local training data distribution associated with the UE 120. For example, the indication transmitted by the network node 110 may indicate the federated learning reporting resource for the federated learning model without identifying the federated learning model (for example, without indicating the federated learning model index associated with the federated learning model).

In some aspects, the network node 110 may not transmit an indication of the federated learning model or the federated learning reporting resource associated with the federated learning model to the UE 120. In such examples, the UE 120 may determine or select the federated learning model and/or a federated learning reporting resource associated with the federated learning model based at least in part on the local training data distribution and the configuration information. In some aspects, the UE 120 may determine a distribution parameter (for example, indicating a distribution class) based at least in part on the local training data distribution associated with the UE 120, and the UE 120 may select, from a plurality of configured federated learning reporting resources, a federated learning reporting resource associated with the distribution parameter determined by the UE 120. In such examples, the federated learning reporting resource selected by the UE 120 may be for a federated learning model reporting resource associated with the federated learning model to be trained by the group of UEs to which the UE is assigned.

In some aspects, in a case in which the UE 120 detects a change in the local training data distribution to an updated local training data distribution, the UE 120 may switch to another federated learning reporting resource associated with another federated learning model based at least in part on the updated local training data distribution. For example, the UE 120 may autonomously switch between federated learning reporting resources based on the local training data distribution, or the UE 120 transmit, to the network node 110, a recommendation to switch federated learning reporting resources (or switch federated learning models) based on the local training data distribution.

As further shown in FIG. 5A, in a sixth operation 530, the UE 120 may transmit, to the network node 110, local gradient information for the federated learning model that is based at least in part on the local training data distribution associated with the UE 120 (for example, the federated learning model associated with the group of UEs to which the UE 120 is assigned). The UE 120 may calculate a local gradient update for the machine learning model based at least in part on a loss function (for example, using SGD), and the UE 120 may perform gradient compression and/or modulation of the local gradient update, as described in connection with FIG. 4. The UE 120 may transmit the local gradient information resulting from the gradient computation and/or the gradient compression to the network node 110. In some aspects, the UE 120 may transmit the local gradient information for the federated learning model in a federated learning reporting resource (for example, an uplink time and/frequency resource) associated with the federated learning model. For example, the federated learning reporting resource may be indicated by the network node 110 in the indication of the federated learning model, or the federated learning reporting resource may be selected by the UE 120 (for example, based on the indicated federated learning model index or based on the local training data distribution) from multiple federated learning reporting resources configured in the configuration information.

In some aspects, in a case in which the UE 120 is configured with respective conditions associated with one or more federated learning models. The UE 120 may select to participate in training the federated learning model based at least in part on the respective condition associated with the federated learning model being satisfied. In such examples, the UE 120 may transmit the local gradient information for the federated learning model based at least in part on the condition associated with the federated learning model being satisfied. For example, the condition associated with a federated learning model may include a scheduling condition and/or an RF configuration condition.

The network node 110 may receive the local gradient information transmitted by the UE 120. In some aspects, the network node 110 may receive the local gradient information transmitted by the UE 120 and respective local gradient information transmitted by other UEs in the group of UEs to which the UE 120 is assigned, and the network node 110 may aggregate the local gradient information received from the UEs in the group of UEs. In some aspects, the network node 110 may indicate (for example, in the indication of the federated learning model or in the configuration information) the same federated learning model reporting resource to be used by all of the UEs in the group of UEs associated with the federated learning model. In such examples, the network node 110 may receive respective transmissions of the local gradient information from all of the UEs in the group of UEs in the same federated learning reporting resource, and the network node 110 may perform OTA aggregation of the local gradient information received from all of the UEs in the group of UEs.

As further shown in FIG. 5A, in a seventh operation 535, the network node 110 may transmit, and the UE 120 may receive, global gradient information for the federated learning model. The network node 110 may calculate a global gradient to update the model parameters of the federated learning model based at least in part on the aggregated local gradient information received from the UEs in the group of UEs associated with the federated learning model. The network node 110 may transmit the global gradient information to the UE 120 and the other UEs in the group of UEs.

In some aspects, the network node 110 may also receive local gradient information from other UEs in one or more other groups of UEs that are assigned based on the local training data distributions of the UEs. In such examples, the network node 110 may calculate respective global gradient information for one or more other federated learning models associated with the one or more other groups of UEs, and the network node 110 transmit the respective global gradient information for each other federated learning model to the UEs in the other group of UEs associated with that federated learning model.

As further shown in FIG. 5A, in an eighth operation 540, the UE 120 may update the federated learning model based at least in part on the global gradient information for the federated learning model. For example, the UE 120 may update the model parameters in a local version of the federated learning model at the UE 120 based at least in part on the global gradient information for the federated learning model received from the network node 110.

Figure 6A:
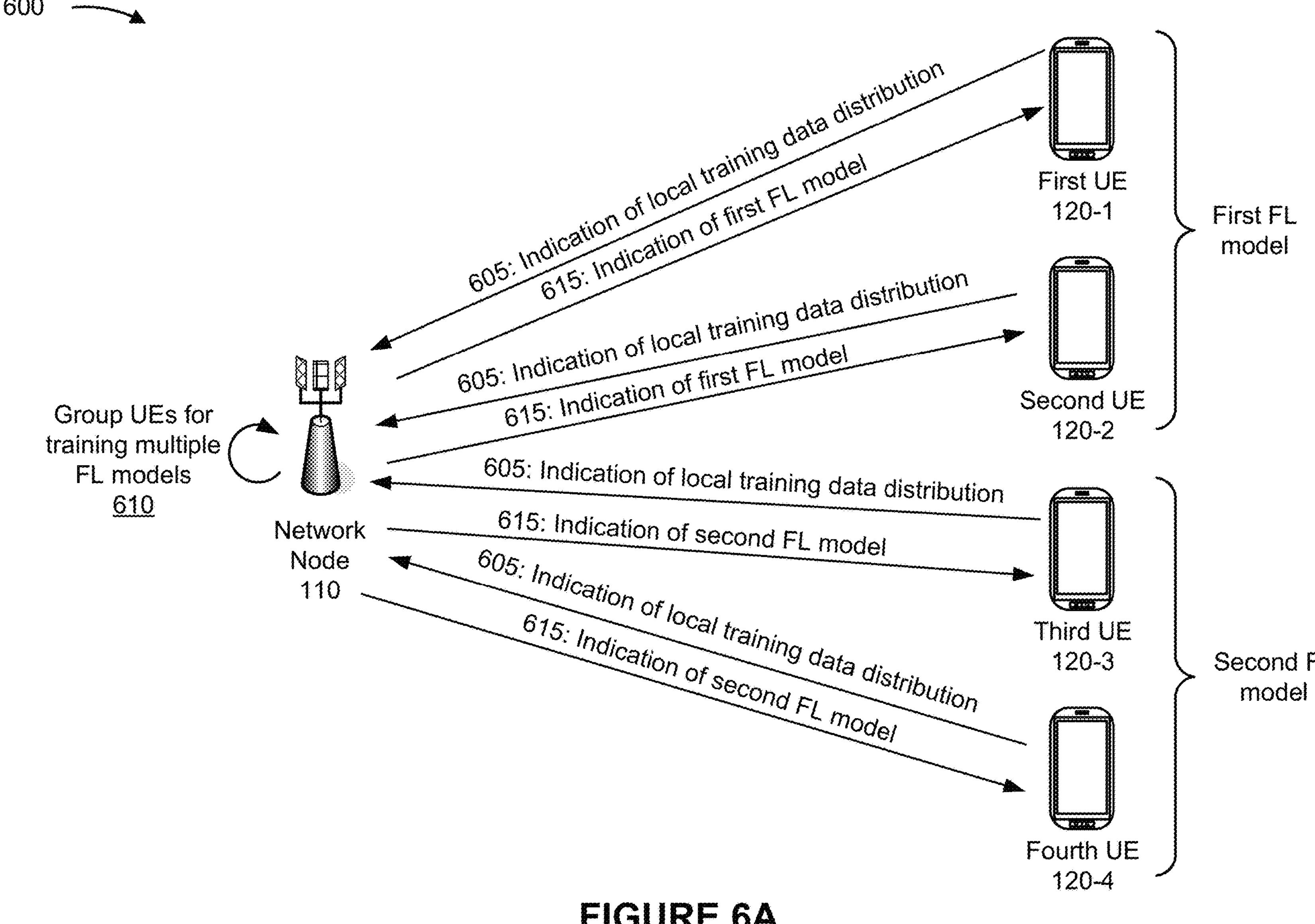
FIGS. 6A-6B are diagrams illustrating an example associated with UE grouping for federated learning in accordance with the present disclosure.
Figure 6B:
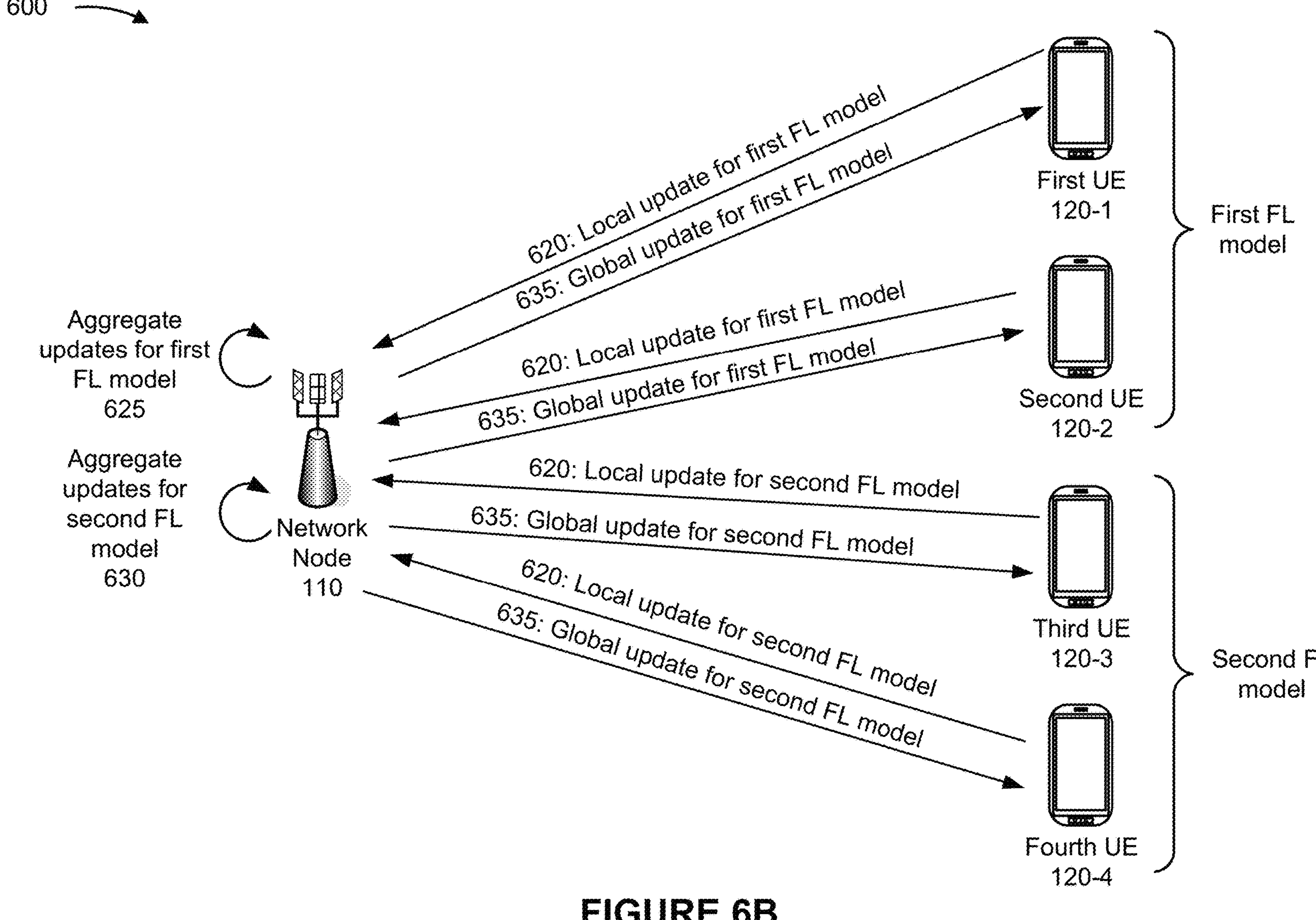

FIGS. 6A-6B are diagrams illustrating an example 600 associated with UE grouping for federated learning, in accordance with the present disclosure. As shown in FIG. 6A, example 600 includes communication between a network node 110 and multiple UEs 120, including a first UE 120-1, a second UE 120-2, a third UE 120-3, and a fourth UE 120-4. In some aspects, the network node 110 and the UEs 120 may be included in a wireless network, such as wireless network 100. The network node 110 and the UEs 120 may communicate via a wireless access links, which may include uplinks and downlinks.

As shown in FIG. 6A, in a first operation 605, each UE 120 may transmit, to the network node 110, an indication of a respective local training data distribution associated with the UE 120. For example, each UE 120 may transmit the indication of the respective local training data distribution as described in connection with FIGS. 5A-5B. In a second operation 610, the network node 110 may group the UEs 120 into multiple groups of UEs for training multiple federated learning models. The network node 110 may assign the UEs 120 into different groups of UEs based at least in part on the respective local training data distributions associated with the UEs 120, as described above in connection with FIGS. 5A-5B. For example, as shown in FIG. 6A, the network node 110 may assign the first UE 120-1 and the second UE 120-2 to a first group of UEs associated with a first federated learning model, and the network node 110 may assign the third UE 120-3 and the fourth UE 120-4 to a second group of UEs associated with a second federated learning model.

In a third operation 615, the network node 110 may transit, to each UE 120, a respective indication of the federated learning model associated with the group of UEs to which the UE 120 is assigned. For example, the network node 110 may transmit an indication of the first federated learning model (and/or an indication of a federated learning reporting resource associated with the first federated learning model) to the first UE 120-1. The network node 110 may transmit an indication of the first federated learning model (and/or an indication of a federated learning reporting resource associated with the first federated learning model) to the second UE 120-2. The network node 110 may transmit an indication of the second federated learning model (and/or an indication of a federated learning reporting resource associated with the second federated learning model) to the third UE 120-3. The network node 110 may transmit an indication of the second federated learning model (and/or an indication of a federated learning reporting resource associated with the second federated learning model) to the fourth UE 120-4.

As shown in FIG. 6B, in a fourth operation 620, each UE 120 may transmit, to the network node 110, a respective local update (for example, respective local gradient information) for the federated learning model indicated for the UE 120. For example, the first UE 120-1 may transmit, to the network node 110, a local updates for the first federated learning model. The second UE 120-2 may transmit, to the network node 110, a local update for the first federated learning model. The second UE 120-2 may transmit, to the network node 110, a local update for the second federated learning model. The fourth UE 120-4 may transmit, to the network node 110, a local update for the second federated learning model.

In a fifth operation 625, the network node 110 may aggregate the local updates for the first federated learning model. For example, the network node 110 may aggregate the respective local updates received from the first group of UEs, including the first UE 120-1 and the second UE 120-2. In some aspects, the first group of UEs, including the first UE 120-1 and the second UE 120-2, may each transmit the respective local update for the first federated learning model on the same uplink resource (for example, a federated learning reporting resource associated with the first federated learning model), and the network node 110 may aggregate the local updates for the first federated learning model using OTA aggregation. The network node 110 may determine a global update (for example, a global gradient) for the first federated learning model based at least in part on the aggregated local updates for the first federated learning model.

In a sixth operation 630, the network node 110 may aggregate the local updates for the second federated learning model. For example, the network node 110 may aggregate the respective local updates received from the second group of UEs, including the third UE 120-3 and the fourth UE 120-4. In some aspects, the second group of UEs, including the third UE 120-3 and the fourth UE 120-4, may each transmit the respective local update for the second federated learning model on the same uplink resource (for example, a federated learning reporting resource associated with the second federated learning model), and the network node 110 may aggregate the local updates for the second federated learning model using OTA aggregation. The network node 110 may determine a global update (for example, a global gradient) for the second federated learning model based at least in part on the aggregated local updates for the second federated learning model.

In a seventh operation 635, the network node 110 may transmit the global update for the first to the first group of UEs, and the network node 110 may transmit the global update for the second federated learning models to the second group of UEs. For example, the network node 110 may transmit the global update for the first federated learning model to the first UE 120-1 and the second UE 120-2. The network node 110 may transmit the global update for the second federated learning model to the third UE 120-3 and the fourth UE 120-4.

FIG. 7 is a flowchart illustrating an example process 700 performed, for example, by a UE that supports UE grouping for federated learning in accordance with the present disclosure. Example process 700 is an example where the UE (for example, UE 120) performs operations associated with UE grouping for federated learning.

As shown in FIG. 7, in some aspects, process 700 may include transmitting, to a network node, an indication of a local training data distribution associated with the UE (block 710). For example, the UE (such as by using communication manager 140 or transmission component 904, depicted in FIG. 9) may transmit, to a network node, an indication of a local training data distribution associated with the UE, as described above.

As further shown in FIG. 7, in some aspects, process 700 may include transmitting, to the network node, local gradient information for a federated learning model that is based at least in part on the local training data distribution associated with the UE (block 720). For example, the UE (such as by using communication manager 140 or transmission component 904, depicted in FIG. 9) may transmit, to the network node, local gradient information for a federated learning model that is based at least in part on the local training data distribution associated with the UE, as described above.

Process 700 may include additional aspects, such as any single aspect or any combination of aspects described below or in connection with one or more other processes described elsewhere herein.

In a first additional aspect, the indication of the local training data distribution includes an indication of at least one of an input training data distribution of a local dataset associated with the UE or an output training data distribution of the local dataset associated with the UE.

In a second additional aspect, alone or in combination with the first aspect, process 700 includes receiving, from the network node, an indication of a federated learning model index associated with the federated learning model.

In a third additional aspect, alone or in combination with one or more of the first and second aspects, process 700 includes receiving, from the network node, an indication of a reporting resource associated with the federated learning model, wherein transmitting the local gradient information includes transmitting the local gradient information in the reporting resource associated with the federated learning model.

In a fourth additional aspect, alone or in combination with one or more of the first through third aspects, process 700 includes receiving, from the network node, configuration information that indicates respective reporting resources associated with multiple federated learning models, wherein the federated learning model that is based at least in part on the local training data distribution associated with the UE is a first federated learning model of the multiple federated learning models, and wherein transmitting the local gradient information includes transmitting the local gradient information in the respective reporting resource associated with the first federated learning model.

In a fifth additional aspect, alone or in combination with one or more of the first through fourth aspects, process 700 includes transmitting, to the network node, an indication of an updated local training data distribution associated with the UE, and transmitting other local gradient information in the respective reporting resource associated with a second federated learning model of the multiple federated learning models based at least in part on the updated local training data distribution associated with the UE.

In a sixth additional aspect, alone or in combination with one or more of the first through fifth aspects, process 700 includes receiving configuration information that indicates a condition associated with the federated learning model, wherein transmitting the local gradient information includes transmitting the local gradient information for the federated learning model based at least in part on the condition being satisfied.

In a seventh additional aspect, alone or in combination with one or more of the first through sixth aspects, the condition associated with the federated learning model includes at least one of a scheduling condition or a radio frequency configuration condition.

In an eighth additional aspect, alone or in combination with one or more of the first through seventh aspects, process 700 includes receiving configuration information that configures reporting of the local training data distribution associated with the UE, wherein transmitting the indication of the local training data distribution includes transmitting the indication of the local training data distribution based at least in part on the configuration information.

In a ninth additional aspect, alone or in combination with one or more of the first through eighth aspects, the indication of the local training data distribution indicates one or more statistical properties associated with the local training data distribution.

In a tenth additional aspect, alone or in combination with one or more of the first through ninth aspects, the indication of the local training data distribution indicate a P-value associated with the local training data distribution.

In an eleventh additional aspect, alone or in combination with one or more of the first through tenth aspects, the indication of the local training data distribution indicates a respective input training data distribution for each of multiple inputs in a local dataset associated with the UE.

In a twelfth additional aspect, alone or in combination with one or more of the first through eleventh aspects, the indication of the local training data distribution indicates a plurality of Gaussian components of a Gaussian mixture distribution, and for each Gaussian component, of the plurality of Gaussian components, the indication includes a respective mean, a respective covariance matrix, and a respective mixing probability.

In a thirteenth additional aspect, alone or in combination with one or more of the first through twelfth aspects, process 700 includes receiving, from the network node, configuration information that indicates the plurality of Gaussian components.

In a fourteenth additional aspect, alone or in combination with one or more of the first through thirteenth aspects, process 700 includes estimating the respective mean, the respective covariance matrix, and the respective mixing probability for each Gaussian component of the plurality of Gaussian components based at least in part on the local training data distribution.

In a fifteenth additional aspect, alone or in combination with one or more of the first through fourteenth aspects, the indication of the local training data distribution indicates the local training data distribution as a mixture distribution including one or more components associated with a base distribution.

In a sixteenth additional aspect, alone or in combination with one or more of the first through fifteenth aspects, the indication of the local training data distribution indicates, for each component of the one or more components of the mixture distribution one or more parameters associated with the base distribution, and a mixing probability.

In a seventeenth additional aspect, alone or in combination with one or more of the first through sixteenth aspects, the base distribution includes at least one of a uniform distribution, an exponential distribution, a Gaussian distribution, or an inverse Gaussian distribution.

In an eighteenth additional aspect, alone or in combination with one or more of the first through seventeenth aspects, process 700 includes receiving, from the network node, configuration information that indicates at least one of the base distribution or a maximum quantity of the one or more components of the mixture distribution.

In a nineteenth additional aspect, alone or in combination with one or more of the first through eighteenth aspects, process 700 includes transmitting, to the network node, capability information that indicates a capability of the UE for reporting the local training data distribution as the mixture distribution, wherein the capability information indicates at least one of a capability for the base distribution or a capability for the maximum quantity of the one or more components of the mixture distribution.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

FIG. 8 is a flowchart illustrating an example process 800 performed, for example, by a network node that supports UE grouping for federated learning in accordance with the present disclosure. Example process 800 is an example where the network node (for example, network node 110) performs operations associated with UE grouping for federated learning.

As shown in FIG. 8, in some aspects, process 800 may include receiving an indication of a local training data distribution associated with a UE (block 810). For example, the network node (such as by using communication manager 150 or reception component 1002, depicted in FIG. 10) may receive an indication of a local training data distribution associated with a UE, as described above.

As further shown in FIG. 8, in some aspects, process 800 may include assigning the UE to a group of UEs associated with a federated learning model, of multiple federated learning models, based at least in part on the local training data distribution associated with the UE (block 820). For example, the network node (such as by using communication manager 150 or grouping component 1008, depicted in FIG. 10) may assign the UE to a group of UEs associated with a federated learning model, of multiple federated learning models, based at least in part on the local training data distribution associated with the UE, as described above.

As further shown in FIG. 8, in some aspects, process 800 may include receiving local gradient information associated with the UE for the federated learning model that is associated with the group of UEs (block 830). For example, the network node (such as by using communication manager 150 or reception component 1002, depicted in FIG. 10) may receive local gradient information associated with the UE for the federated learning model that is associated with the group of UEs, as described above.

Process 800 may include additional aspects, such as any single aspect or any combination of aspects described below or in connection with one or more other processes described elsewhere herein.

In a first additional aspect, the indication of the local training data distribution includes an indication of at least one of an input training data distribution of a local dataset associated with the UE or an output training data distribution of the local dataset associated with the UE.

In a second additional aspect, alone or in combination with the first aspect, process 800 includes transmitting, to the UE, an indication of a federated learning model index associated with the federated learning model.

In a third additional aspect, alone or in combination with one or more of the first and second aspects, process 800 includes transmitting, to the UE, an indication of a reporting resource associated with the federated learning model, wherein receiving the local gradient information includes receiving the local gradient information in the reporting resource associated with the federated learning model.

In a fourth additional aspect, alone or in combination with one or more of the first through third aspects, process 800 includes transmitting, to the UE, configuration information that indicates respective reporting resources associated with multiple federated learning models, wherein the federated learning model that is based at least in part on the local training data distribution associated with the UE is a first federated learning model of the multiple federated learning models, and wherein receiving the local gradient information includes receiving the local gradient information in the respective reporting resource associated with the first federated learning model.

In a fifth additional aspect, alone or in combination with one or more of the first through fourth aspects, process 800 includes receiving indication of an updated local training data distribution associated with the UE, and receiving other local gradient information in the respective reporting resource associated with a second federated learning model of the multiple federated learning models based at least in part on the updated local training data distribution associated with the UE.

In a sixth additional aspect, alone or in combination with one or more of the first through fifth aspects, process 800 includes transmitting configuration information that indicates a condition associated with the federated learning model, wherein receiving the local gradient information includes receiving the local gradient information for the federated learning model based at least in part on the condition being satisfied.

In a seventh additional aspect, alone or in combination with one or more of the first through sixth aspects, the condition associated with the federated learning model includes at least one of a scheduling condition or a radio frequency configuration condition.

In an eighth additional aspect, alone or in combination with one or more of the first through seventh aspects, process 800 includes transmitting configuration information that configures reporting of the local training data distribution associated with the UE, wherein receiving the indication of the local training data distribution includes receiving the indication of the local training data distribution based at least in part on the configuration information.

In a ninth additional aspect, alone or in combination with one or more of the first through eighth aspects, the indication of the local training data distribution indicates one or more statistical properties associated with the local training data distribution.

In a tenth additional aspect, alone or in combination with one or more of the first through ninth aspects, the indication of the local training data distribution indicate a P-value associated with the local training data distribution.

In an eleventh additional aspect, alone or in combination with one or more of the first through tenth aspects, the indication of the local training data distribution indicates a respective input training data distribution for each of multiple inputs in a local dataset associated with the UE.

In a twelfth additional aspect, alone or in combination with one or more of the first through eleventh aspects, the indication of the local training data distribution indicates a plurality of Gaussian components of a Gaussian mixture distribution, and for each Gaussian component, of the plurality of Gaussian components, the indication includes a respective mean, a respective covariance matrix, and a respective mixing probability.

In a thirteenth additional aspect, alone or in combination with one or more of the first through twelfth aspects, process 800 includes transmitting configuration information that indicates the plurality of Gaussian components.

In a fourteenth additional aspect, alone or in combination with one or more of the first through thirteenth aspects, the indication of the local training data distribution indicates the local training data distribution as a mixture distribution including one or more components associated with a base distribution.

In a fifteenth additional aspect, alone or in combination with one or more of the first through fourteenth aspects, the indication of the local training data distribution indicates, for each component of the one or more components of the mixture distribution one or more parameters associated with the base distribution, and a mixing probability.

In a sixteenth additional aspect, alone or in combination with one or more of the first through fifteenth aspects, the base distribution includes at least one of a uniform distribution, an exponential distribution, a Gaussian distribution, or an inverse Gaussian distribution.

In a seventeenth additional aspect, alone or in combination with one or more of the first through sixteenth aspects, process 800 includes transmitting configuration information that indicates at least one of the base distribution or a maximum quantity of the one or more components of the mixture distribution.

In an eighteenth additional aspect, alone or in combination with one or more of the first through seventeenth aspects, process 800 includes receiving capability information that indicates a capability of the UE for reporting the local training data distribution as the mixture distribution, wherein the capability information indicates at least one of a capability for the base distribution or a capability for the maximum quantity of the one or more components of the mixture distribution.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
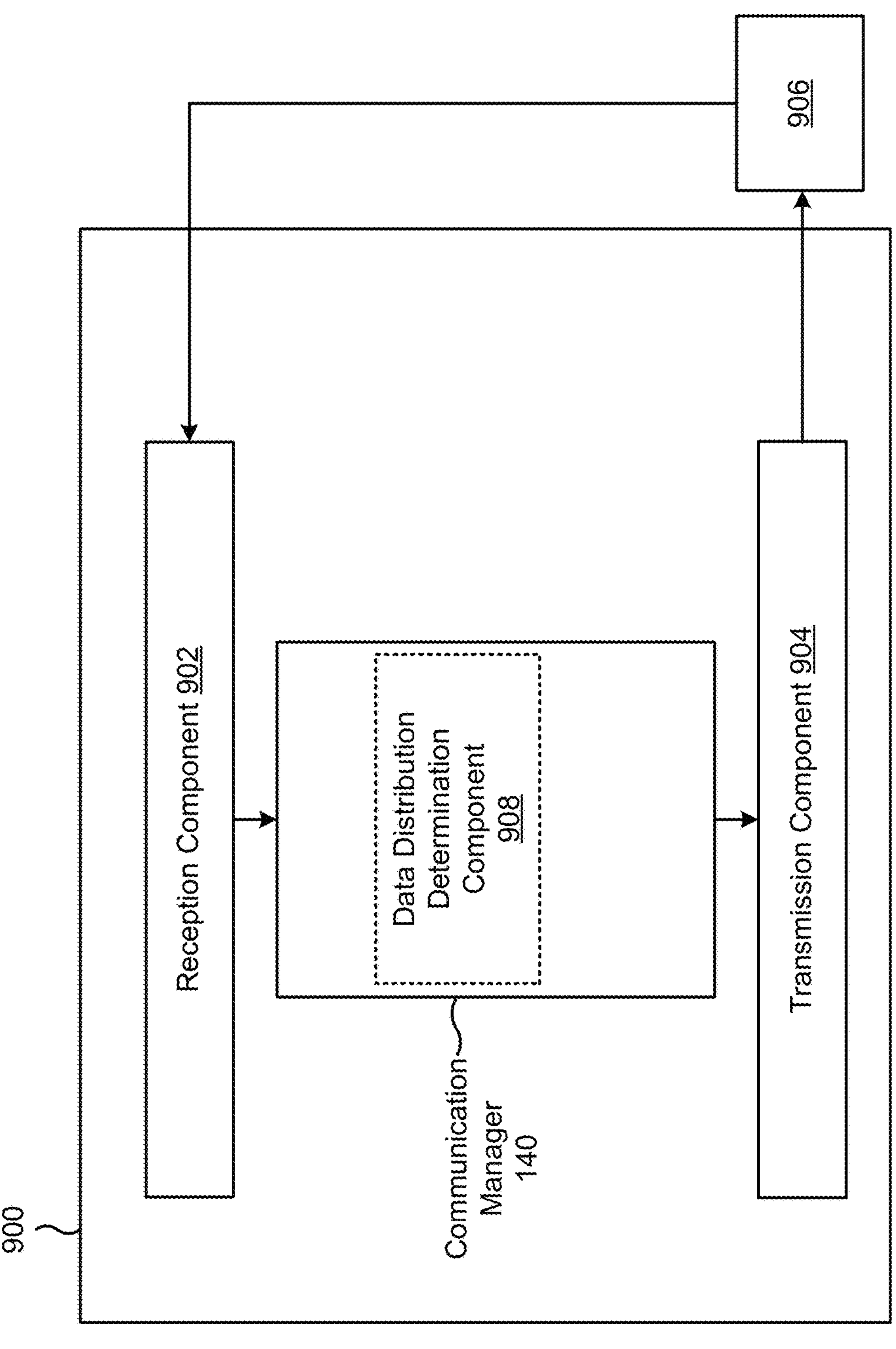
FIG. 9 is a diagram of an example apparatus for wireless communication that supports UE grouping for federated learning in accordance with the present disclosure.

FIG. 9 is a diagram of an example apparatus 900 for wireless communication that supports UE grouping for federated learning in accordance with the present disclosure. The apparatus 900 may be a UE, or a UE may include the apparatus 900. In some aspects, the apparatus 900 includes a reception component 902, a transmission component 904, and a communication manager 140, which may be in communication with one another (for example, via one or more buses). As shown, the apparatus 900 may communicate with another apparatus 906 (such as a UE, a network node, or another wireless communication device) using the reception component 902 and the transmission component 904.

In some aspects, the apparatus 900 may be configured to perform one or more operations described herein in connection with FIGS. 5A-5B and 6A-6B. Additionally or alternatively, the apparatus 900 may be configured to perform one or more processes described herein, such as process 700 of FIG. 7. In some aspects, the apparatus 900 may include one or more components of the UE described above in connection with FIG. 2.

The reception component 902 may receive communications, such as reference signals, control information, and/or data communications, from the apparatus 906. The reception component 902 may provide received communications to one or more other components of the apparatus 900, such as the communication manager 140. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a modem, a demodulator, a MIMO detector, a receive processor, a controller/processor, and/or a memory of the UE described above in connection with FIG. 2.

The transmission component 904 may transmit communications, such as reference signals, control information, and/or data communications, to the apparatus 906. In some aspects, the communication manager 140 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, and/or a memory of the UE described above in connection with FIG. 2. In some aspects, the transmission component 904 may be co-located with the reception component 902 in a transceiver.

The communication manager 140 may transmit or may cause the transmission component 904 to transmit, to a network node, an indication of a local training data distribution associated with the UE. The communication manager 140 may transmit or may cause the transmission component 904 to transmit, to the network node, local gradient information for a federated learning model that is based at least in part on the local training data distribution associated with the UE. In some aspects, the communication manager 140 may perform one or more operations described elsewhere herein as being performed by one or more components of the communication manager 140.

The communication manager 140 may include a controller/processor and/or a memory of the UE described above in connection with FIG. 2. In some aspects, the communication manager 140 includes a set of components, such as a data distribution determination component 908. Alternatively, the set of components may be separate and distinct from the communication manager 140. In some aspects, one or more components of the set of components may include or may be implemented within a controller/processor and/or a memory of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 904 may transmit, to a network node, an indication of a local training data distribution associated with the UE. The transmission component 904 may transmit, to the network node, local gradient information for a federated learning model that is based at least in part on the local training data distribution associated with the UE.

The reception component 902 may receive, from the network node, an indication of a federated learning model index associated with the federated learning model.

The reception component 902 may receive, from the network node, an indication of a reporting resource associated with the federated learning model. The transmission component 904 may transmit the local gradient information in the reporting resource associated with the federated learning model.

The reception component 902 may receive, from the network node, configuration information that indicates respective reporting resources associated with multiple federated learning models, wherein the federated learning model that is based at least in part on the local training data distribution associated with the UE is a first federated learning model of the multiple federated learning models. The transmission component 904 may transmit the local gradient information in the respective reporting resource associated with the first federated learning model.

The transmission component 904 may transmit, to the network node, an indication of an updated local training data distribution associated with the UE.

The transmission component 904 may transmit other local gradient information in the respective reporting resource associated with a second federated learning model of the multiple federated learning models based at least in part on the updated local training data distribution associated with the UE.

The reception component 902 may receive configuration information that indicates a condition associated with the federated learning model. The transmission component 904 may transmit the local gradient information for the federated learning model based at least in part on the condition being satisfied.

The reception component 902 may receive configuration information that configures reporting of the local training data distribution associated with the UE. The transmission component 904 may transmit the indication of the local training data distribution based at least in part on the configuration information.

The reception component 902 may receive, from the network node, configuration information that indicates the plurality of Gaussian components.

The data distribution determination component 908 may estimate the mean, the covariance matrix, and the mixing probability for each Gaussian component of the quantity of Gaussian components based at least in part on the local training data distribution.

The reception component 902 may receive, from the network node, configuration information that indicates at least one of the base distribution or a maximum quantity of the one or more components of the mixture distribution.

The transmission component 904 may transmit, to the network node, capability information that indicates a capability of the UE for reporting the local training data distribution as the mixture distribution, wherein the capability information indicates at least one of a capability for the base distribution or a capability for the maximum quantity of the one or more components of the mixture distribution.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
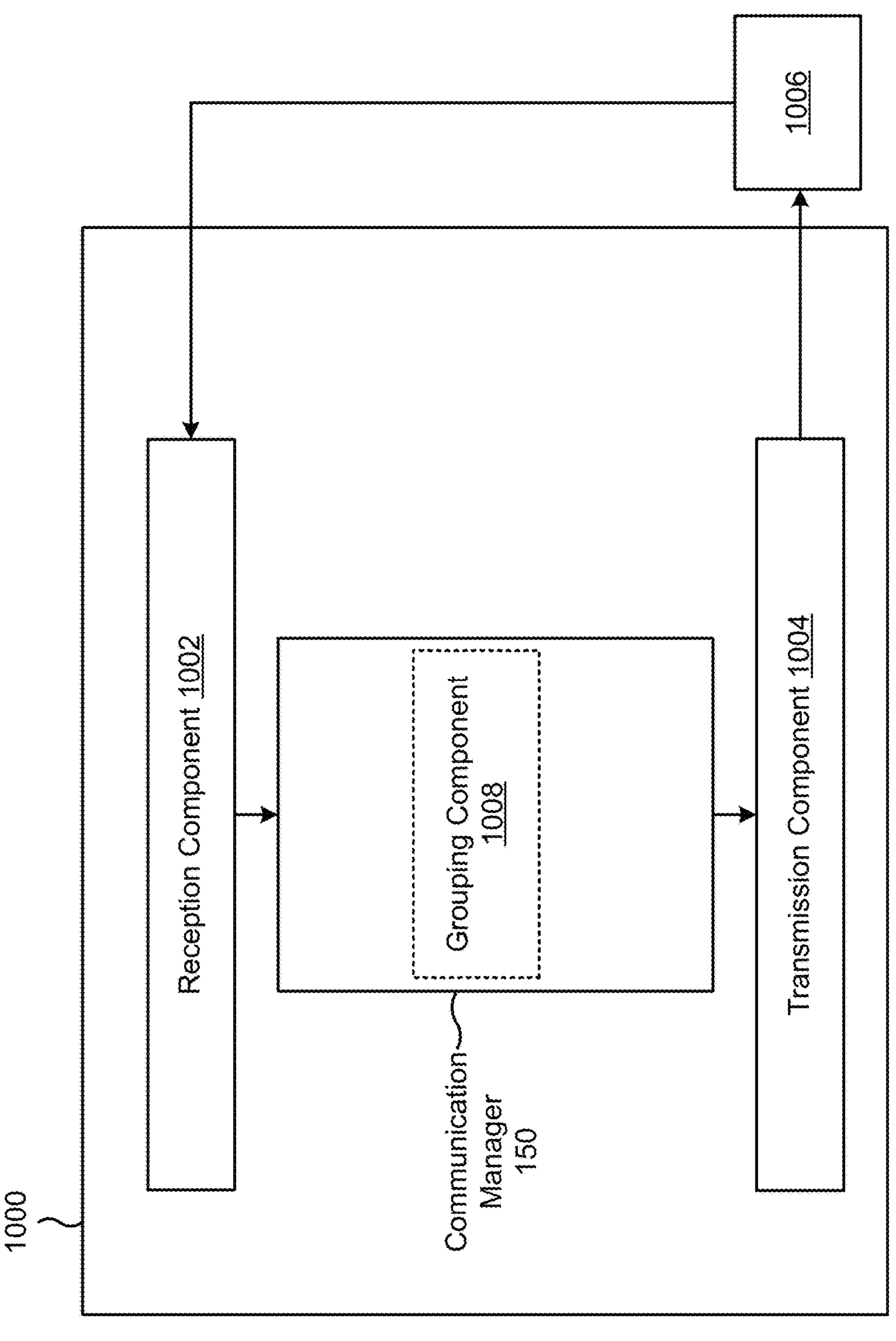
FIG. 10 is a diagram of an example apparatus for wireless communication that supports UE grouping for federated learning in accordance with the present disclosure.

FIG. 10 is a diagram of an example apparatus 1000 for wireless communication that supports UE grouping for federated learning in accordance with the present disclosure. The apparatus 1000 may be a network node, or a network node may include the apparatus 1000. In some aspects, the apparatus 1000 includes a reception component 1002, a transmission component 1004, and a communication manager 150, which may be in communication with one another (for example, via one or more buses). As shown, the apparatus 1000 may communicate with another apparatus 1006 (such as a UE, a network node, or another wireless communication device) using the reception component 1002 and the transmission component 1004.

In some aspects, the apparatus 1000 may be configured to perform one or more operations described herein in connection with FIGS. 5A-5B and 6A-6B. Additionally or alternatively, the apparatus 1000 may be configured to perform one or more processes described herein, such as process 800 of FIG. 8. In some aspects, the apparatus 1000 may include one or more components of the network node described above in connection with FIG. 2.

The reception component 1002 may receive communications, such as reference signals, control information, and/or data communications, from the apparatus 1006. The reception component 1002 may provide received communications to one or more other components of the apparatus 1000, such as the communication manager 150. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a modem, a demodulator, a MIMO detector, a receive processor, a controller/processor, and/or a memory of the network node described above in connection with FIG. 2.

The transmission component 1004 may transmit communications, such as reference signals, control information, and/or data communications, to the apparatus 1006. In some aspects, the communication manager 150 may generate communications and may transmit the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, and/or a memory of the network node described above in connection with FIG. 2. In some aspects, the transmission component 1004 may be co-located with the reception component 1002 in a transceiver.

The communication manager 150 may receive or may cause the reception component 1002 to receive an indication of a local training data distribution associated with a UE. The communication manager 150 may assign the UE to a group of UEs associated with a federated learning model, of multiple federated learning models, based at least in part on the local training data distribution associated with the UE. The communication manager 150 may receive or may cause the reception component 1002 to receive local gradient information associated with the UE for the federated learning model that is associated with the group of UEs. In some aspects, the communication manager 150 may perform one or more operations described elsewhere herein as being performed by one or more components of the communication manager 150.

The communication manager 150 may include a controller/processor, a memory, a scheduler, and/or a communication unit of the network node described above in connection with FIG. 2. In some aspects, the communication manager 150 includes a set of components, such as a grouping component 1008. Alternatively, the set of components may be separate and distinct from the communication manager 150. In some aspects, one or more components of the set of components may include or may be implemented within a controller/processor, a memory, a scheduler, and/or a communication unit of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive an indication of a local training data distribution associated with a UE. The grouping component 1008 may assign the UE to a group of UEs associated with a federated learning model, of multiple federated learning models, based at least in part on the local training data distribution associated with the UE. The reception component 1002 may receive local gradient information associated with the UE for the federated learning model that is associated with the group of UEs.

The transmission component 1004 may transmit, to the UE, an indication of a federated learning model index associated with the federated learning model.

The transmission component 1004 may transmit, to the UE, an indication of a reporting resource associated with the federated learning model. The reception component 1002 may receive the local gradient information in the reporting resource associated with the federated learning model.

The transmission component 1004 may transmit, to the UE, configuration information that indicates respective reporting resources associated with multiple federated learning models, wherein the federated learning model that is based at least in part on the local training data distribution associated with the UE is a first federated learning model of the multiple federated learning models. The reception component 1002 may receive the local gradient information in the respective reporting resource associated with the first federated learning model.

The reception component 1002 may receive indication of an updated local training data distribution associated with the UE.

The reception component 1002 may receive other local gradient information in the respective reporting resource associated with a second federated learning model of the multiple federated learning models based at least in part on the updated local training data distribution associated with the UE.

The transmission component 1004 may transmit configuration information that indicates a condition associated with the federated learning model. The reception component 1002 may receive the local gradient information for the federated learning model based at least in part on the condition being satisfied.

The transmission component 1004 may transmit configuration information that configures reporting of the local training data distribution associated with the UE. The reception component 1002 may receive the indication of the local training data distribution based at least in part on the configuration information.

The transmission component 1004 may transmit configuration information that indicates the plurality of Gaussian components.

The transmission component 1004 may transmit configuration information that indicates at least one of the base distribution or a maximum quantity of the one or more components of the mixture distribution.

The reception component 1002 may receive capability information that indicates a capability of the UE for reporting the local training data distribution as the mixture distribution, wherein the capability information indicates at least one of a capability for the base distribution or a capability for the maximum quantity of the one or more components of the mixture distribution.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: transmitting, to a network node, an indication of a local training data distribution associated with the UE; and transmitting, to the network node, local gradient information for a federated learning model that is based at least in part on the local training data distribution associated with the UE.

Aspect 2: The method of Aspect 1, wherein the indication of the local training data distribution includes an indication of at least one of an input training data distribution of a local dataset associated with the UE or an output training data distribution of the local dataset associated with the UE.

Aspect 3: The method of any of Aspects 1-2, further comprising: receiving, from the network node, an indication of a federated learning model index associated with the federated learning model.

Aspect 4: The method of any of Aspects 1-3, further comprising receiving, from the network node, an indication of a reporting resource associated with the federated learning model, wherein transmitting the local gradient information comprises: transmitting the local gradient information in the reporting resource associated with the federated learning model.

Aspect 5: The method of any of Aspects 1-4, further comprising receiving, from the network node, configuration information that indicates respective reporting resources associated with multiple federated learning models, wherein the federated learning model that is based at least in part on the local training data distribution associated with the UE is a first federated learning model of the multiple federated learning models, and wherein transmitting the local gradient information comprises: transmitting the local gradient information in the respective reporting resource associated with the first federated learning model.

Aspect 6: The method of Aspect 5, further comprising: transmitting, to the network node, an indication of an updated local training data distribution associated with the UE; and transmitting other local gradient information in the respective reporting resource associated with a second federated learning model of the multiple federated learning models based at least in part on the updated local training data distribution associated with the UE.

Aspect 7: The method of any of Aspects 1-6, further comprising receiving configuration information that indicates a condition associated with the federated learning model, wherein transmitting the local gradient information comprises: transmitting the local gradient information for the federated learning model based at least in part on the condition being satisfied.

Aspect 8: The method of Aspect 7, wherein the condition associated with the federated learning model includes at least one of a scheduling condition or a radio frequency configuration condition.

Aspect 9: The method of any of Aspects 1-8, further comprising receiving configuration information that configures reporting of the local training data distribution associated with the UE, wherein transmitting the indication of the local training data distribution comprises: transmitting the indication of the local training data distribution based at least in part on the configuration information.

Aspect 10: The method of any of Aspects 1-9, wherein the indication of the local training data distribution indicates one or more statistical properties associated with the local training data distribution.

Aspect 11: The method of any of Aspects 1-10, wherein the indication of the local training data distribution indicate a P-value associated with the local training data distribution.

Aspect 12: The method of any of Aspects 1-11, wherein the indication of the local training data distribution indicates a respective input training data distribution for each of multiple inputs in a local dataset associated with the UE.

Aspect 13: The method of any of Aspects 1-12, wherein the indication of the local training data distribution indicates a plurality of Gaussian components of a Gaussian mixture distribution, and wherein, for each Gaussian component, of the plurality of Gaussian components, the indication includes: a respective mean, a respective covariance matrix, and a respective mixing probability.

Aspect 14: The method of Aspect 13, further comprising: receiving, from the network node, configuration information that indicates the plurality of Gaussian components.

Aspect 15: The method of any of Aspects 13-14, further comprising: estimating the respective mean, the respective covariance matrix, and the respective mixing probability for each Gaussian component of the plurality of Gaussian components based at least in part on the local training data distribution.

Aspect 16: The method of any of Aspects 1-15, wherein the indication of the local training data distribution indicates the local training data distribution as a mixture distribution including one or more components associated with a base distribution.

Aspect 17: The method of Aspect 16, wherein the indication of the local training data distribution indicates, for each component of the one or more components of the mixture distribution: one or more parameters associated with the base distribution, and a mixing probability.

Aspect 18: The method of any of Aspects 16-17, wherein the base distribution includes at least one of a uniform distribution, an exponential distribution, a Gaussian distribution, or an inverse Gaussian distribution.

Aspect 19: The method of any of Aspects 16-18, further comprising: receiving, from the network node, configuration information that indicates at least one of the base distribution or a maximum quantity of the one or more components of the mixture distribution.

Aspect 20: The method of Aspect 19, further comprising: transmitting, to the network node, capability information that indicates a capability of the UE for reporting the local training data distribution as the mixture distribution, wherein the capability information indicates at least one of a capability for the base distribution or a capability for the maximum quantity of the one or more components of the mixture distribution.

Aspect 21: A method of wireless communication performed by a network node, comprising: receiving an indication of a local training data distribution associated with a user equipment (UE); assigning the UE to a group of UEs associated with a federated learning model, of multiple federated learning models, based at least in part on the local training data distribution associated with the UE; and receiving local gradient information associated with the UE for the federated learning model that is associated with the group of UEs.

Aspect 22: The method of Aspect 21, wherein the indication of the local training data distribution includes an indication of at least one of an input training data distribution of a local dataset associated with the UE or an output training data distribution of the local dataset associated with the UE.

Aspect 23: The method of any of Aspects 21-22, further comprising: transmitting, to the UE, an indication of a federated learning model index associated with the federated learning model.

Aspect 24: The method of any of Aspects 21-23, further comprising transmitting, to the UE, an indication of a reporting resource associated with the federated learning model, wherein receiving the local gradient information comprises: receiving the local gradient information in the reporting resource associated with the federated learning model.

Aspect 25: The method of any of Aspects 21-24, further comprising transmitting, to the UE, configuration information that indicates respective reporting resources associated with multiple federated learning models, wherein the federated learning model that is based at least in part on the local training data distribution associated with the UE is a first federated learning model of the multiple federated learning models, and wherein receiving the local gradient information comprises: receiving the local gradient information in the respective reporting resource associated with the first federated learning model.

Aspect 26: The method of Aspect 25, further comprising: receiving indication of an updated local training data distribution associated with the UE; and receiving other local gradient information in the respective reporting resource associated with a second federated learning model of the multiple federated learning models based at least in part on the updated local training data distribution associated with the UE.

Aspect 27: The method of any of Aspects 21-26, further comprising transmitting configuration information that indicates a condition associated with the federated learning model, wherein receiving the local gradient information comprises: receiving the local gradient information for the federated learning model based at least in part on the condition being satisfied.

Aspect 28: The method of Aspect 27, wherein the condition associated with the federated learning model includes at least one of a scheduling condition or a radio frequency configuration condition.

Aspect 29: The method of any of Aspects 21-28, further comprising transmitting configuration information that configures reporting of the local training data distribution associated with the UE, wherein receiving the indication of the local training data distribution comprises: receiving the indication of the local training data distribution based at least in part on the configuration information.

Aspect 30: The method of any of Aspects 21-29, wherein the indication of the local training data distribution indicates one or more statistical properties associated with the local training data distribution.

Aspect 31: The method of any of Aspects 21-30, wherein the indication of the local training data distribution indicate a P-value associated with the local training data distribution.

Aspect 32: The method of any of Aspects 21-31, wherein the indication of the local training data distribution indicates a respective input training data distribution for each of multiple inputs in a local dataset associated with the UE.

Aspect 33: The method of any of Aspects 21-32, wherein the indication of the local training data distribution indicates a plurality of Gaussian components of a Gaussian mixture distribution, and wherein, for each Gaussian component, of the plurality of Gaussian components, the indication includes: a respective mean, a respective covariance matrix, and a respective mixing probability.

Aspect 34: The method of Aspect 33, further comprising: transmitting configuration information that indicates the plurality of Gaussian components.

Aspect 35: The method of any of Aspects 21-34, wherein the indication of the local training data distribution indicates the local training data distribution as a mixture distribution including one or more components associated with a base distribution.

Aspect 36: The method of Aspect 35, wherein the indication of the local training data distribution indicates, for each component of the one or more components of the mixture distribution: one or more parameters associated with the base distribution, and a mixing probability.

Aspect 37: The method of any of Aspects 35-36, wherein the base distribution includes at least one of a uniform distribution, an exponential distribution, a Gaussian distribution, or an inverse Gaussian distribution.

Aspect 38: The method of any of Aspects 35-37, further comprising: transmitting configuration information that indicates at least one of the base distribution or a maximum quantity of the one or more components of the mixture distribution.

Aspect 39: The method of Aspect 38, further comprising: receiving capability information that indicates a capability of the UE for reporting the local training data distribution as the mixture distribution, wherein the capability information indicates at least one of a capability for the base distribution or a capability for the maximum quantity of the one or more components of the mixture distribution.

Aspect 40: An apparatus for wireless communication at a device, comprising a processor; memory coupled with the processor; and instructions stored in the memory and executable by the processor to cause the apparatus to perform the method of one or more of Aspects 1-39.

Aspect 41: A device for wireless communication, comprising a memory and one or more processors coupled to the memory, the one or more processors configured to perform the method of one or more of Aspects 1-39.

Aspect 42: An apparatus for wireless communication, comprising at least one means for performing the method of one or more of Aspects 1-39.

Aspect 43: A non-transitory computer-readable medium storing code for wireless communication, the code comprising instructions executable by a processor to perform the method of one or more of Aspects 1-39.

Aspect 44: A non-transitory computer-readable medium storing a set of instructions for wireless communication, the set of instructions comprising one or more instructions that, when executed by one or more processors of a device, cause the device to perform the method of one or more of Aspects 1-39.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:

at least one memory; and at least one processor communicatively coupled with the at least one memory, the at least one processor configured to cause the UE to:

transmit, to a network node, an indication of a local training data distribution associated with the UE;

receive, from the network node in response to the indication of the local training data distribution associated with the UE, configuration information comprising a federated learning model index associated with a federated learning model of a plurality of federated learning models, wherein the federated learning model index corresponds to a group of UEs, each UE of the group of UEs having a respective local training data distribution within a range of local training data distributions; and transmit, to the network node, local gradient information in accordance with the federated learning model that is based at least in part on the local training data distribution associated with the UE.

2. The UE of claim 1, wherein the indication of the local training data distribution includes an indication of at least one of an input training data distribution of a local dataset associated with the UE or an output training data distribution of the local dataset associated with the UE.

3. The UE of claim 1, wherein the at least one processor is further configured to cause the UE to receive, from the network node, an indication of a reporting resource associated with the federated learning model, wherein, to cause the UE to transmit the local gradient information, the at least one processor is configured to cause the UE to:

transmit the local gradient information in the reporting resource associated with the federated learning model.

4. The UE of claim 1, wherein the at least one processor is further configured to cause the UE to receive, from the network node, configuration information that indicates respective reporting resources associated with multiple federated learning models, wherein the federated learning model that is based at least in part on the local training data distribution associated with the UE is a first federated learning model of the multiple federated learning models, and wherein, to cause the UE to transmit the local gradient information, the at least one processor is configured to cause the UE to:

transmit the local gradient information in the respective reporting resource associated with the first federated learning model.

5. The UE of claim 4, wherein the at least one processor is further configured to cause the UE to:

transmit, to the network node, an indication of an updated local training data distribution associated with the UE; and transmit other local gradient information in the respective reporting resource associated with a second federated learning model of the multiple federated learning models based at least in part on the updated local training data distribution associated with the UE.

6. The UE of claim 1, wherein the configuration information indicates a scheduling condition.

7. The UE of claim 1, wherein the at least one processor is further configured to cause the UE to receive configuration information that configures reporting of the local training data distribution associated with the UE, wherein, to cause the UE to transmit the indication of the local training data distribution, the at least one processor is configured to cause the UE to:

transmit the indication of the local training data distribution based at least in part on the configuration information.

8. The UE of claim 1, wherein the indication of the local training data distribution indicates one or more statistical properties associated with the local training data distribution.

9. The UE of claim 1, wherein the indication of the local training data distribution indicate a P-value associated with the local training data distribution.

10. The UE of claim 1, wherein the indication of the local training data distribution indicates a respective input training data distribution for each of multiple inputs in a local dataset associated with the UE.

11. The UE of claim 1, wherein the indication of the local training data distribution indicates a plurality of Gaussian components of a Gaussian mixture distribution, and wherein, for each Gaussian component, of the plurality of Gaussian components, the indication includes:

a respective mean, a respective covariance matrix, and a respective mixing probability.

12. The UE of claim 11, wherein the at least one processor is further configured to cause the UE to:

receive, from the network node, configuration information that indicates the plurality of Gaussian components.

13. The UE of claim 11, wherein the at least one processor is further configured to cause the UE to:

estimate the respective mean, the respective covariance matrix, and the respective mixing probability for each Gaussian component of the plurality of Gaussian components based at least in part on the local training data distribution.

14. The UE of claim 1, wherein the indication of the local training data distribution indicates the local training data distribution as a mixture distribution including one or more components associated with a base distribution.

15. The UE of claim 14, wherein the indication of the local training data distribution indicates, for each component of the one or more components of the mixture distribution:

one or more parameters associated with the base distribution, and a mixing probability.

16. The UE of claim 14, wherein the base distribution includes at least one of a uniform distribution, an exponential distribution, a Gaussian distribution, or an inverse Gaussian distribution.

17. The UE of claim 14, wherein the at least one processor is further configured to cause the UE to:

receive, from the network node, configuration information that indicates at least one of the base distribution or a maximum quantity of the one or more components of the mixture distribution.

18. The UE of claim 17, wherein the at least one processor is further configured to cause the UE to:

transmit, to the network node, capability information that indicates a capability of the UE for reporting the local training data distribution as the mixture distribution, wherein the capability information indicates at least one of a capability for the base distribution or a capability for the maximum quantity of the one or more components of the mixture distribution.

19. A network node for wireless communication, comprising:

at least one memory; and at least one processor communicatively coupled with the at least one memory, the at least one processor configured to cause the network node to:

receive an indication of a local training data distribution associated with a user equipment (UE);

in response to the indication of the local training data distribution associated with the UE, assign the UE to a group of UEs, the group of UEs associated with a federated learning model of a plurality of federated learning models, wherein each UE of the group of UEs has a respective local training data distribution within a range of local training data distributions;

transmit configuration information comprising a federated learning model index associated with the federated learning model of the plurality of federated learning models, wherein the federated learning model index corresponds to the group of UEs; and receive local gradient information associated with the UE in accordance with the federated learning model that is associated with the group of UEs.

20. The network node of claim 19, wherein the at least one processor is further configured to cause the network node to transmit, to the UE, an indication of a reporting resource associated with the federated learning model, wherein, to cause the network node to receive the local gradient information, the at least on processor is configured to cause the network node to:

receive the local gradient information in the reporting resource associated with the federated learning model.

21. The network node of claim 19, wherein the at least one processor is further configured to cause the network node to transmit, to the UE, configuration information that indicates respective reporting resources associated with multiple federated learning models, wherein the federated learning model that is based at least in part on the local training data distribution associated with the UE is a first federated learning model of the multiple federated learning models, and wherein, to cause the network node to receive the local gradient information, the at least on processor is configured to cause the network node to:

receive the local gradient information in the respective reporting resource associated with the first federated learning model.

22. The network node of claim 19, wherein the at least one processor is further configured to cause the network node to transmit configuration information that configures reporting of the local training data distribution associated with the UE, wherein, to cause the network node to receive the indication of the local training data distribution, the at least on processor is configured to cause the network node to:

receive the indication of the local training data distribution based at least in part on the configuration information.

23. The network node of claim 19, wherein the indication of the local training data distribution indicates one or more statistical properties associated with the local training data distribution.

24. The network node of claim 19, wherein the indication of the local training data distribution indicates a plurality of Gaussian components of a Gaussian mixture distribution, and wherein, for each Gaussian component, of the plurality of Gaussian components, the indication includes:

a respective mean, a respective covariance matrix, and a respective mixing probability.

25. The network node of claim 19, wherein the indication of the local training data distribution indicates the local training data distribution as a mixture distribution including one or more components associated with a base distribution.

26. The network node of claim 19, wherein the configuration information indicates a scheduling condition.

27. A method of wireless communication performed by a user equipment (UE), comprising:

transmitting, to a network node, an indication of a local training data distribution associated with the UE;

receiving, from the network node in response to the indication of the local training data distribution associated with the UE, configuration information comprising a federated learning model index associated with a federated learning model of a plurality of federated learning models, wherein the federated learning model index corresponds to a group of UEs, each UE of the group of UEs having a respective local training data distribution within a range of local training data distributions; and transmitting, to the network node, local gradient information in accordance with the federated learning model that is based at least in part on the local training data distribution associated with the UE.

28. The method of claim 27, wherein the configuration information indicates a scheduling condition.

29. A method of wireless communication performed by a network node, comprising:

receiving an indication of a local training data distribution associated with a user equipment (UE);

in response to the indication of the local training data distribution associated with the UE, assigning the UE to a group of UEs, the group of UEs associated with a federated learning model of a plurality of federated learning models, wherein each UE of the group of UEs has a respective local training data distribution within a range of local training data distributions;

transmitting configuration information comprising a federated learning model index associated with the federated learning model of the plurality of federated learning models, wherein the federated learning model index corresponds to the group of UEs; and receiving local gradient information associated with the UE in accordance with the federated learning model that is associated with the group of UEs.

30. The method of claim 29, wherein the configuration information indicates a scheduling condition.

* * * * *